United States Patent
Fuglevand et al.

(10) Patent No.: US 6,939,636 B2
(45) Date of Patent: Sep. 6, 2005

(54) AIR COOLED FUEL CELL MODULE

(75) Inventors: William A. Fuglevand, Spokane, WA (US); Shibli Hanna I. Bayyuk, Spokane, WA (US); Greg A. Lloyd, Spokane, WA (US); Shalena V. Wilkerson, Spokane, WA (US); Matthew M. Wright, Spokane, WA (US)

(73) Assignee: Relion, Inc., Spokane, WA (US)

( * ) Notice: Subject to any disclaimer, the term of this patent is extended or adjusted under 35 U.S.C. 154(b) by 14 days.

(21) Appl. No.: 10/425,822

(22) Filed: Apr. 28, 2003

(65) Prior Publication Data
US 2004/0214057 A1 Oct. 28, 2004

(51) Int. Cl.⁷ .......................... H01M 8/04; H01M 8/02; H01M 8/10
(52) U.S. Cl. ............................ 429/26; 429/38; 429/39; 429/44
(58) Field of Search ............................ 429/26, 30, 34, 429/39, 40, 44, 32, 38

(56) References Cited

U.S. PATENT DOCUMENTS

| | | |
|---|---|---|
| 4,847,172 A | 7/1989 | Maskalick et al. |
| 4,997,728 A | 3/1991 | Onoda et al. |
| 5,035,962 A | 7/1991 | Jensen |
| 5,037,525 A | 8/1991 | Badwal |
| 5,059,497 A | 10/1991 | Prince et al. |
| 5,143,801 A | 9/1992 | Bates |
| 5,286,568 A | 2/1994 | Bacino et al. |
| 5,346,780 A | 9/1994 | Suzuki |
| 5,618,392 A | 4/1997 | Furuya |
| 5,635,039 A | 6/1997 | Cisar et al. |
| 5,733,682 A | 3/1998 | Quadakkers et al. |
| 5,736,269 A | 4/1998 | Okamoto et al. |
| 5,786,105 A | 7/1998 | Matsushima et al. |
| 5,795,671 A | 8/1998 | Nirasawa et al. |
| 5,945,231 A | 8/1999 | Narayanan et al. |
| 5,998,057 A | 12/1999 | Koschany et al. |
| 6,010,798 A | 1/2000 | Hammerschmidt et al. |
| 6,022,634 A | 2/2000 | Ramunni et al. |
| 6,030,718 A | 2/2000 | Fuglevand et al. |
| 6,037,075 A | 3/2000 | Critz et al. |
| 6,042,955 A | 3/2000 | Okamoto |
| 6,051,343 A | 4/2000 | Suzuki et al. |

(Continued)

FOREIGN PATENT DOCUMENTS

| | | |
|---|---|---|
| JP | HEI 91997-503819 | 12/1994 |
| WO | WO 01/82399 | 11/2001 |

OTHER PUBLICATIONS

B.D. Cullity, "Elements of X–Ray Diffraction," Addison–Wesley Publishing Co., Inc., ©1978.

Woo–kum Lee et al., "The Effects of Compression and Gas Diffusion Layers on the Performance of a PEM Fuel Cell." *Journal of Power Sources*, 1999 Elsevier Science, pp. 45–51.

(Continued)

*Primary Examiner*—Jonathan Crepeau
(74) *Attorney, Agent, or Firm*—Wells St. John P.S.

(57) ABSTRACT

An air cooled fuel cell module is described and which includes an ion exchange membrane having opposite anode and cathode sides; an electrode borne by each of the anode and cathode sides; and a cathode heat sink positioned in heat removing relation relative to the cathode side of the ion exchange membrane, and which, in one form of the invention, can simultaneously act as a current collector.

2 Claims, 15 Drawing Sheets

U.S. PATENT DOCUMENTS

| | | | |
|---|---|---|---|
| 6,051,778 | A | 4/2000 | Ichinose et al. |
| 6,054,228 | A | 4/2000 | Cisar et al. |
| 6,054,230 | A | 4/2000 | Kato |
| 6,066,409 | A | 5/2000 | Ronne et al. |
| 6,080,290 | A | 6/2000 | Stuart et al. |
| 6,096,449 | A | 8/2000 | Fuglevand et al. |
| 6,146,780 | A | 11/2000 | Cisar et al. |
| 6,153,330 | A | 11/2000 | Kenyon et al. |
| 6,183,898 | B1 | 2/2001 | Koschany et al. |
| 6,194,099 | B1 | 2/2001 | Gernov et al. |
| 6,200,698 | B1 | 3/2001 | Carlstrom, Jr. |
| 6,207,310 | B1 | 3/2001 | Wilson et al. |
| 6,218,035 | B1 | 4/2001 | Fuglevand et al. |
| 6,218,039 | B1 | 4/2001 | Mease et al. |
| 6,228,518 | B1 | 5/2001 | Kindler |
| 6,232,008 | B1 | 5/2001 | Wozniczka et al. |
| 6,255,012 | B1 | 7/2001 | Wilson et al. |
| 6,268,076 | B1 | 7/2001 | Diekmann et al. |
| 6,280,868 | B1 | 8/2001 | Badwal et al. |
| 6,280,870 | B1 | 8/2001 | Eisman et al. |
| 6,287,717 | B1 | 9/2001 | Cavalca et al. |
| 6,291,094 | B1 | 9/2001 | Yoshimura et al. |
| 6,322,914 | B1 | 11/2001 | Chow et al. |
| 6,365,293 | B1 | 4/2002 | Isono et al. |
| 6,387,556 | B1 | 5/2002 | Fuglevand et al. |
| 6,467,334 | B2 | 10/2002 | Lloyd et al. |
| 6,468,682 | B1 | 10/2002 | Fugleuand et al. |
| 6,497,974 | B2 | 12/2002 | Fuglevand |
| 6,531,238 | B1 | 3/2003 | King |
| 6,566,004 | B1 | 5/2003 | Fly et al. |
| 6,703,155 | B2 | 3/2004 | Scartozzi et al. |
| 6,716,549 | B2 | 4/2004 | Bai et al. |
| 2002/0081745 | A1 | 6/2002 | Simpkins et al. |
| 2002/0114990 | A1 * | 8/2002 | Fly et al. ...................... 429/44 |
| 2002/0127452 | A1 * | 9/2002 | Wilkinson et al. ............ 429/32 |
| 2004/0043279 | A1 | 3/2004 | Scartozzi et al. |
| 2004/0086775 | A1 | 5/2004 | Lloyd et al. |

OTHER PUBLICATIONS

Jari Ihonan et al., "A Novel Polymer Electrolyte Fuel Cell for Laboratory Investigations and in-situ contact Resistance Measurments," *Electrochimica Acta*, 2001 Elsevier Science, pp. 2899–2911.

Oliver Murphy et al., "Low-Cost Light Weight High Power Density PEM Fuel Cell Stack," *Electrochimics Acta*, 1998 Elsevier Science, pp. 3829–3840.

M. F. Ashby, "The Mechanical Properties of Cellular Solids," *Metallurgical Transactions*, vol. 14A, Sep. 1983, pp. 1755–1769.

* cited by examiner

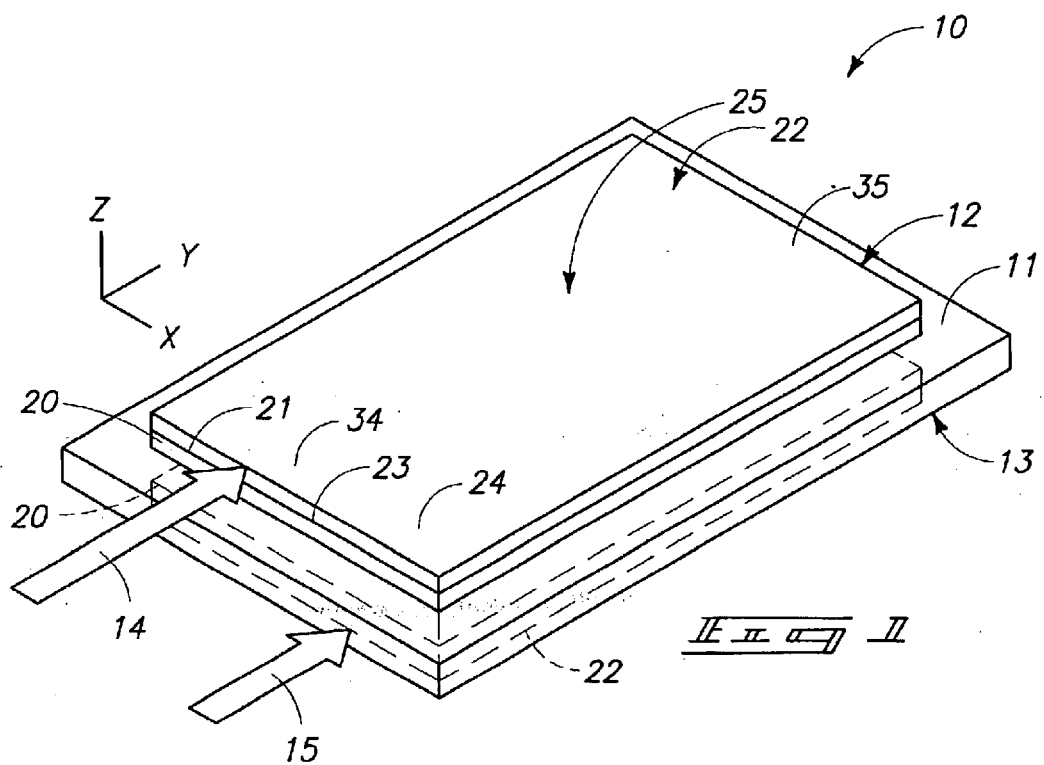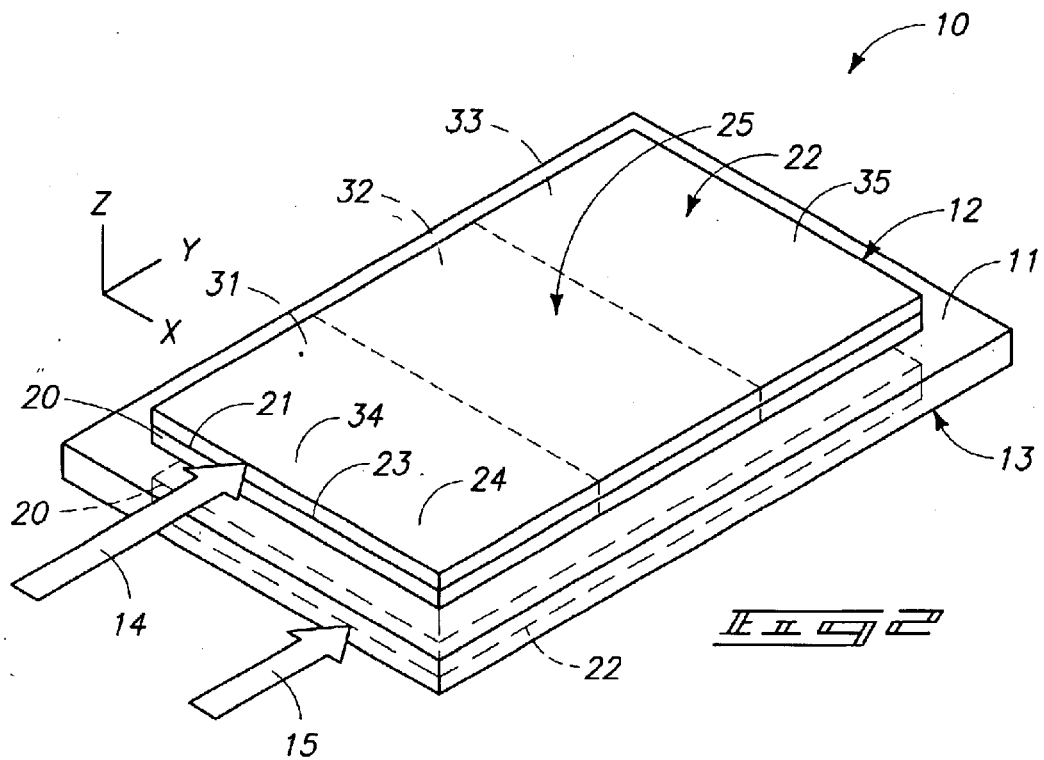

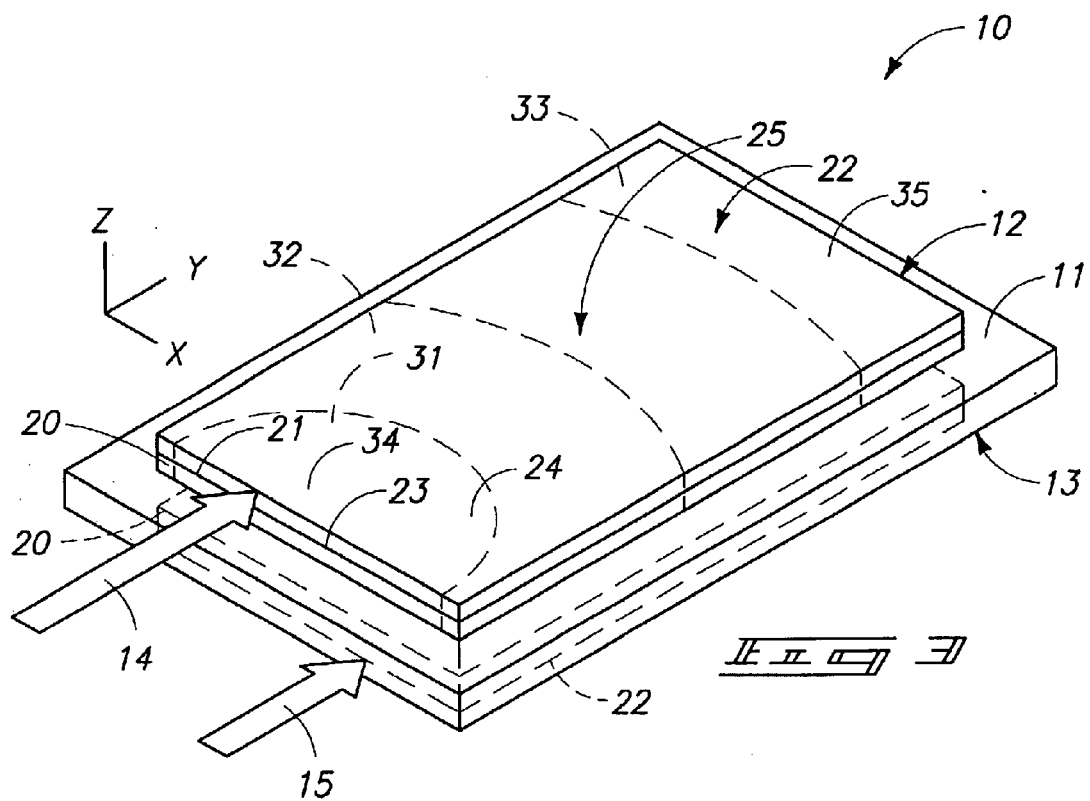
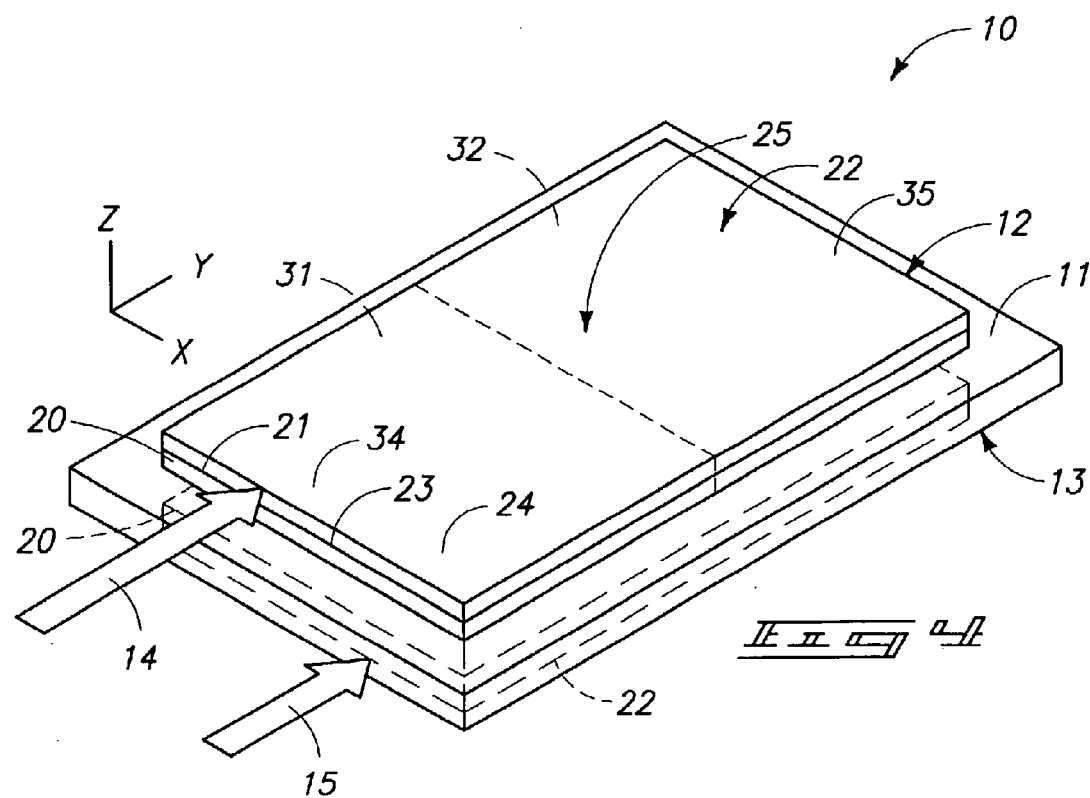

AIR COOLED FUEL CELL MODULE

TECHNICAL FIELD

The present invention relates to a fuel cell, and more specifically to an air cooled fuel cell having a cathode heat sink which is positioned in heat removing relation relative to the cathode side of an ion exchange membrane, and which simultaneously functions as a current collector for the air cooled fuel cell module.

BACKGROUND OF THE INVENTION

A fuel cell is a device which can readily convert chemical energy into electrical and heat energy by the reaction of a fuel gas with a suitable oxidant supply. In a proton exchange membrane fuel cell, for example, the fuel gas is typically hydrogen and the oxidant supply comprises oxygen (or more typically ambient air). In fuel cells of this type, a membrane electrode diffusion layer assembly is provided and which includes a solid polymer electrolyte which has opposite anode and cathode sides. During operation, fuel gas reacts in the presence of a catalyst which is incorporated into the electrode on the anode side to produce hydrogen ions which migrate through the solid polymer electrolyte to the opposite cathode side. Meanwhile, the oxidant supply introduced to the cathode side is present to react with hydrogen ions in the presence of the catalyst which is incorporated into the electrode, on that side, to produce water and a resulting electrical output.

Many fuel cell designs have been provided through the years, and much research and development activity has been conducted to develop a fuel cell which meets perceived performance and cost per watt requirements for various users. Despite decades of research, fuel cells have not been widely embraced except for narrow commercial applications. While many designs have been proposed and have operated with various degrees of success, shortcomings in some peculiar aspect of their individual designs have resulted in difficulties which have detracted from their widespread commercial acceptance and perceived usefulness.

For example, one of the perceived challenges for fuel cell engineers has been to design fuel cells which can be scaled to size to meet various commercial applications. Still further, efforts have been made, as of late, to design fuel cells which can be readily maintained by providing a modular design which allows a failing module to be removed from service while the remaining modules continue operating. Modular fuel cell construction is disclosed in further detail in the following U.S. Patents, all of which are incorporated by reference herein: U.S. Pat. Nos. 6,030,718; 6,096,449; 6,218,035; 6,387,556; 6,467,334; 6,468,682; 6,497,974; and co-pending U.S. patent application Ser. No. 10/033,599 now U.S. Pat. No. 6,716,549 and 10/289,694.

In several of the references noted above, the inventors have addressed some of the remaining challenges in fuel cell construction including the reduction of contact resistance in the fuel cell in order to increase electrical output. Still further, various gas diffusion layers and other constructions are disclosed and which optimize the relative hydration of the ion exchange membrane and extend the operational temperature range of the fuel cell.

An air cooled fuel cell module which addresses the perceived shortcomings in the prior art teachings and practices is the subject matter of the present application.

SUMMARY OF THE INVENTION

A first aspect of the present invention relates to an air cooled fuel cell module which includes an ion exchange membrane having opposite anode and cathode sides; an electrode borne by each of the anode and cathode sides; and a cathode heat sink positioned in heat removing relation relative to the cathode side of the ion exchange membrane.

Another aspect of the present invention relates to a fuel cell module which includes an ion exchange membrane having opposite anode and cathode sides; an electrode borne on each of the anode and cathode sides; an electrically conductive gas diffusion layer borne by one of the electrodes; a cathode air flow supplied to the cathode side of the ion exchange membrane; and an air-permeable metal foam current collector disposed in ohmic electrical contact with the cathode side of the ion exchange membrane, and wherein the fuel cell module generates heat energy during operation, and wherein the air-permeable metal foam current collector has a thermal conductivity value which facilitates both the efficient transmission of the heat energy generated during fuel cell module operation away from the ion exchange membrane and to the cathode air flow, and the operational hydration of the ion exchange membrane.

Yet another aspect of the present invention relates to a fuel cell module which includes an ion exchange membrane having opposite anode and cathode sides; an electrode borne on each of the anode and cathode sides, and wherein the fuel cell, during operation, generates heat energy and water as byproducts, and wherein the water produced as a byproduct operably hydrates, at least in part, the ion exchange membrane; an electrically conductive gas diffusion layer borne on one of the anode and/or cathode sides and which is disposed in at least partial covering relation relative to the electrode; a cathode air flow having a flow rate, and which is supplied to the cathode side of the ion exchange membrane; and an air-permeable metal foam current collector disposed in ohmic electrical contact with the cathode side of the ion exchange membrane, and which has a porosity and a thermal conductivity value, and wherein the porosity and thermal conductivity values of the air-permeable metal foam current collector are selected so as to permit the cathode air flow which passes through the air-permeable metal foam to have a reduced flow rate while simultaneously providing an adequate amount of air to support fuel cell module operation, and while simultaneously facilitating the dissipation of at least a portion of the heat energy generated during fuel cell module operation, and wherein the cathode air flow rate further does not cause either, evaporation of excessive amounts of water from the ion exchange membrane, or retention of water by the ion exchange membrane in an excessive amount which would substantially impede fuel cell module operation.

These and other aspect of the present invention will be discussed in further detail hereinafter.

BRIEF DESCRIPTION OF THE DRAWINGS

Preferred embodiments of the invention are described below with reference to the following accompanying drawings.

FIG. 1 is a somewhat simplified, and exaggerated depiction of a membrane electrode diffusion layer assembly which employs some of the teachings of the present invention.

FIG. 2 is a somewhat simplified, and exaggerated depiction of a membrane electrode diffusion layer assembly which illustrates a second form of the structure illustrated in FIG. 1.

FIG. 3 is a somewhat simplified, and exaggerated depiction of a membrane electrode diffusion layer assembly which illustrates still another form of the structure illustrated in FIG. 1.

FIG. 4 is a somewhat simplified, and exaggerated depiction of a membrane electrode diffusion layer assembly which illustrates yet another form of the structure illustrated in FIG. 1.

FIG. 10 is a graphic depiction of current density; pressure; and fuel cell ESR for a fuel cell employing a membrane electrode diffusion layer assembly as seen in FIGS. 1–4.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 16:
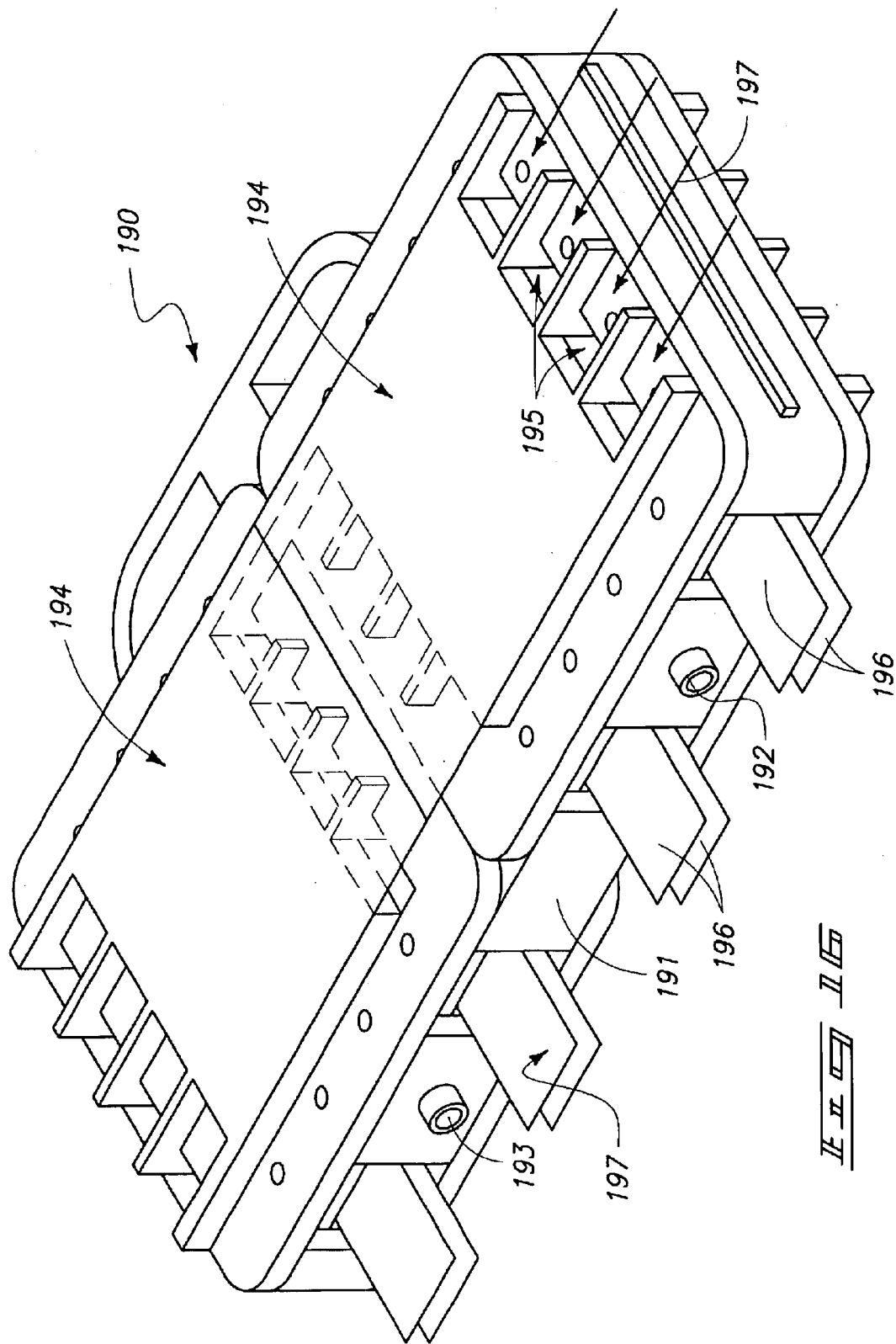
FIG. 16 is a perspective, side elevational view of an ion exchange membrane fuel cell module which employs the teachings of the present invention.

FIG. 1 is a greatly enlarged, perspective view of a membrane electrode diffusion layer assembly 10 which employs some of the teachings of the present invention. As will be appreciated from a further study of FIGS. 9 and 11; and 12–14 other surfaces or structures have been removed to more clearly understand the surfaces and structures thereunder. The membrane electrode diffusion layer assembly (MEDLA) is received within, or made integral with, an ion exchange membrane fuel cell module such as what is depicted in FIGS. 16 and/or 17, the features of which will be discussed in greater detail hereinafter. For purposes of the present discussion, however, the MEDLA 10, as will be disclosed below, is useful in fuel cells which operate at temperatures of less than about 300° C. Consequently, this invention is not useful in solid oxide fuel cell designs, and other fuel cells which generally operate at temperatures greater than about 300° C. As will be appreciated by a study of FIGS. 1–4, for example, various aspects of the construction of the MEDLA 10 can be expressed in terms of dimensions as measured substantially along the X, Y and Z axes. In this regard the X and Y axes relate to the length and width dimension of an object, and the Z axis relates to the thickness of the same object. As seen in FIG. 1, and following, a fuel cell employing the present invention will typically utilize an ion exchange membrane 11, such as may be purchased under the trade name "Nafion". This ion exchange membrane 11 is a thin, flexible, and sheet-like material which is made from a sulfonated fluoropolymer. This ion exchange membrane is commercially available from the Dupont™ company. The ion exchange membrane 11 has opposite anode and cathode sides 12 and 13 respectively. As seen in FIGS. 1–4, the anode side 12 of the MEDLA 10 can be provided with a fuel supply which is generally indicated by the numeral 14. Still further, the opposite cathode side 13 is provided with an oxidant air supply or cathode air flow having flow rate and which is generally indicated by the numeral 15. As will be discussed in greater detail with respect to specific forms of ion exchange membrane fuel cells which employ the present invention, the air supply or cathode air flow 15 which is provided to the MEDLA 10 also provides a convenient means for regulating the overall operational temperature of the fuel cell. For example, in one form of the invention (FIG. 16), a preponderance of the heat energy generated during fuel cell operation is removed by way of the cathode air supply 15 which is provided to the cathode side 13 of the ion exchange membrane 11. In another form of the invention (FIG. 17), less than a preponderance of the heat energy is removed by way of the cathode air supply provided to the cathode side of the ion exchange membrane.

As will be discussed in greater detail below, the cathode air flow 15 has a flow rate which is regulated to facilitate the removal of a portion of the heat energy which is generated during operation of the membrane electrode diffusion layer assembly 10, while simultaneously supplying a cathode air flow 15 in an amount, which while supporting the operation of the membrane electrode diffusion layer assembly 10, does not simultaneously cause either the excessive evaporation or retention of water from the membrane electrode diffusion layer assembly in an amount which would substantially impede the operation of same.

As will be seen from a study of FIGS. 1–4, an electrode layer 20 is disposed in ion exchanging relation relative to the respective anode and cathode sides 12 and 13, respectively. The electrode layer 20 is of conventional design, and which, during fuel cell operation, facilitates the generation and movement of ions across the ion exchange membrane 11. Each electrode layer 20 has an outwardly facing surface 21. As seen in FIG. 1 a gas diffusion layer 22 is borne by, or otherwise juxtaposed relative to the outwardly facing surface 21 of the electrode layer 20. In one form of the invention, the gas diffusion layer 22 is applied as a carbon based slurry which may be modified, as needed, to provide different levels or degrees of hydrophobicity and porosity for the anode and cathode sides 13 and 14, respectively.

As used in this application, the word porous means the volume of interstices of a material relative to the volume of the mass of the material. Porosity effects the state of permeability of a material, that is the property of a porous material that is the measure of the amount (rate or volume) at which a fluid (liquid or gas) passes through a unit of cross-section of material at a given viscosity, under a unit of gradient pressure. Therefore, at fixed gradient pressure, and viscosity, the permeability of a given material is directly related to its porosity. For purposes of this application, therefore, the terms porosity and permeability may be used interchangeably with the understanding that an increase in porosity (interstical volume) will normally result in an increase in permeability, and vice versa.

In the present invention, the gas diffusion layer 22 may be modified, as provided below, to achieve improved performance characteristics by providing effective and substantially uniform hydration of the ion exchange membrane 11. While the gas diffusion layer 22, as shown in FIGS. 1–4, is illustrated as a single layer, this same gas diffusion layer, as will be discussed below, may include individually discrete layers each having a different porosity (permeability) and hydrophobicity.

As best illustrated in FIGS. 1–4, it will be seen that the outwardly facing surface 24 of each gas diffusion layer 22 defines a major surface 25. In the present invention, at least one of the gas diffusion layers 22 located on the anode or cathode side 12 and 13 has a hydrophobicity which varies when measured in a direction which is substantially along the major surface 25 and which facilitates the substantially optimal hydration of the ion exchange membrane 11 at typical fuel cell operating temperatures. For example, as seen in FIG. 1, the gas diffusion layer 22 which is juxtaposed relative to the anode side 12 and cathode side 13 of the ion exchange membrane 11 may both have a variable hydrophobicity. In the alternative, it is possible that only one of the anode or cathode sides has a variable hydrophobic gas diffusion layer 22. Still further in another form of the invention, the gas diffusion layer 22 may have a hydrophobicity which varies when measured in the X axis; Y axis; X and Y axes; and X, Y and Z axes. As should be understood by a study of FIGS. 1–4, the oxidant or cathode air stream 15 and fuel supplies 14 each have a direction of flow as indicated by the arrows relative to the major surface 25. As will appreciated, the hydrophobicity of the respective gas diffusion layers may vary when measured in substantially the same general direction of flow of the fuel supply 14; and/or oxidant supply 15. These directions of flow may be either linear, or non-linear.

As seen in FIG. 2, and in an alternative form of the invention, the ion exchange membrane 11 includes a gas diffusion layer 22 having discrete first, second and third zones 31, 32 and 33 respectively. The respective discrete zones may each have individually unique yet substantially constant hydrophobicity. However, in one form of the invention, the relative hydrophobicity of the respective zones may be variable, or a mixture of substantially constant and variable hydrophobicity zones may be provided. Still referring to FIG. 2, in still another form of the invention, where the gas diffusion layer 22 has a plurality of discrete zones 31, 32 and 33, one of the discrete zones may have a continuously variable hydrophobicity; and the hydrophobicity of the remaining zones are variable and subsequently different in the degree of their respective hydrophobic natures from the continuously variable one. Yet further, in another form of the invention the discrete zones 31–33 may have substantially similar surface areas, and the hydrophobicity of the respective discrete zones is variable. As seen in FIG. 3, and in another form of the invention, the gas diffusion layer 22 as provided on the anode side 12 of the ion exchange membrane 11 has a plurality of discrete zones 31, 32 and 33 respectively, and wherein at least one of the discrete zones has a surface area which is dissimilar from the remaining discrete zones. As will be appreciated from this discussion, the hydrophobicity of the discrete zones 31, 32 and 33 may be varied in assorted combinations to achieve a variety of operational objectives. In each of the forms of the invention as seen in FIGS. 1–4, the gas diffusion layer 22 includes a plurality of discrete zones 31–33, each of which has a surface area, and wherein the hydrophobicity and surface area of the respective zones are varied to provide a substantially favorable hydration of the ion exchange membrane 11. In addition to providing optimal hydration, the hydrophobicity and surface area of the respective zones 31–33 may be varied to provide a substantially enhanced current density for the ion exchange membrane 11 as will be discussed, hereinafter. Moreover, in each of the forms of the invention, where a plurality of discrete zones 31, 32 and 33 are provided, it is possible for the hydrophobicity and the surface area of the respective zones to be varied to provide both a substantially favorable hydration and enhanced current density for the ion exchange membrane 11. Still further, in those forms of the invention as shown in FIGS. 1–4 that include a plurality of discrete zones, the gas diffusion layer 22 may be provided with a variable porosity (permeability). In this arrangement, the hydrophobicity, porosity (permeability) and surface area of the respective zones may be varied to provide both substantially optimal hydration and enhanced current density for the ion exchange membrane 11.

As discussed above, the ion exchange membrane 11 is provided with fuel and oxidant or cathode air supplies 14 and 15, respectively, and which are each introduced to the ion exchange membrane at a first location 34 which is located along the major surface 25. Further, any remaining fuel, oxidant, or any byproducts are removed from the ion exchange membrane 11 at a second location or bleed 35 which is located along the major surface 25. The oxidant and fuel supplies 14 and 15 move in linear and/or nonlinear paths of travel between the first and second locations. In the arrangements as shown in FIGS. 1–4, the hydrophobicity may vary when measured in substantially the same direction of flow of the respective paths of travel. In another form of the invention, the hydrophobicity may vary when measured in substantially the same general direction of flow as the fuel supply 14. Still further, in other forms of the invention, the hydrophobicity of the gas diffusion layer 22 is greatest at a location adjacent the first location 34, and is least when measured at a location adjacent to the second location 35. In still other forms of the invention, the hydrophobicity of the gas diffusion layer 22 may be least when measured at a location adjacent the first location 34, and may be the greatest when measured at a location adjacent to the second location 35. In each of the non-limiting and representative examples, noted above, the hydrophobicity is varied in order to provide a substantially uniform and appropriate hydration for the ion exchange membrane 11, and increased current density, both of which provide for improved performance for a fuel cell which incorporates the MEDLA 10.

As will be discussed in greater detail with respect to FIGS. 9 and 11, it should be understood that the gas diffusion layer 22 may comprise two portions which are juxtaposed or located closely adjacent to the outwardly facing surface 21 of the electrode 20. In this regard, the gas diffusion layer 22 may comprise a macro-diffusion layer which includes, in one form, a carbon fiber based sheet having a porosity, which is, as a general matter, greater than the porosity of an adjacent micro-diffusion layer which is made integral therewith. This macro-diffusion layer can be commercially purchased under the trade name "Toray" from various commercial sources. The micro-diffusion layer, which will be discussed in greater detail hereinafter, is made integral with a macro-diffusion layer. In combination these two layers define the gas diffusion layer 22. It should be understood that the gas diffusion layer 22, which is described herein, as including both a macro-diffusion layer, and a micro-diffusion layer, may in some forms of the invention include only one of these two previously described diffusion layers.

Figure 5:
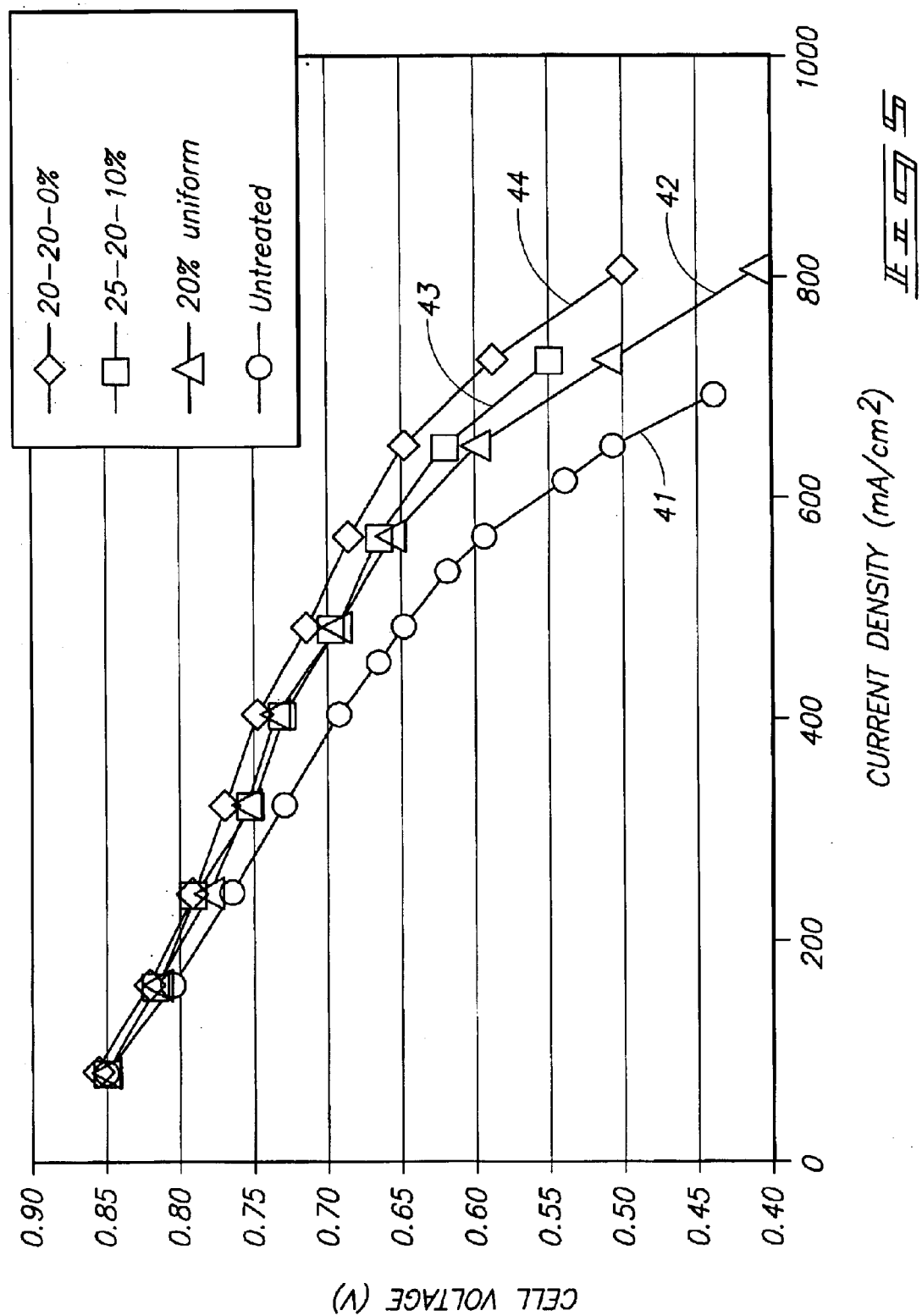
FIG. 5 is a graphic depiction of fuel cell voltage versus current density for a fuel cell having a membrane electrode diffusion layer assembly as seen in FIGS. 1–4.

Referring now to FIG. 5, a graph is provided and which shows the relationship of current voltage versus current density at a substantially constant ambient temperature, and which is expressed in milliamps per square centimeter of surface area for four different MEDLA's 10, and which demonstrate some of the performance characteristics of the present invention. As will be seen in FIG. 5, the line label 41 graphically depicts an ion exchange membrane fuel cells performance employing a MEDLA 10 which has a gas diffusion layer 22 which has not been treated in any fashion to provide an enhanced or variable hydrophobicity. The line label 42 in FIG. 5 depicts the performance of an ion exchange membrane fuel cell utilizing a MEDLA 10 which is provided with a gas diffusion layer 22 which is fabricated in a fashion so as to have a micro-diffusion layer which has a substantially uniform TEFLON™ (PTFE) content of about 20% and a particulate carbon content of about 80%. The PTFE renders the micro-diffusion layer hydrophobic. A comparison of lines 41 and 42 will reveal that providing a gas diffusion layer with an enhanced hydrophobicity markedly increases the performance characteristics of a fuel cell incorporating same. Still referring to FIG. 5, line 43 graphically illustrates the performance of an ion exchange membrane fuel cell incorporating a MEDLA 10, and wherein gas diffusion layer 22 includes first, second and third zones 31, 32 and 33, respectively. In this regard, the first zone 31 has a PTFE content of about 25%; the second zone has a PTFE content of about 20%; and the third zone has a PTFE content of about 10%. It will be seen by a comparison of line 43, with lines 41 and 42, that further enhanced performance characteristics, and higher current densities can be realized by providing a plurality of zones each having a different hydrophobicity. Referring now to line 44 in FIG. 5, the performance of a MEDLA 10 for use in an ion exchange membrane fuel cell is shown and which has a plurality of zones as earlier discussed. In this regard the first zone 31 has a PTFE content of about 20%; the second zone 32 has a PTFE content of about 20%; and the third zone 33 has substantially no PTFE content. As will be seen, further enhanced current densities and fuel cell voltages are realized in this gas diffusion layer 22 arrangement as compared with lines 41, 42, and 43 respectively.

Figure 6:
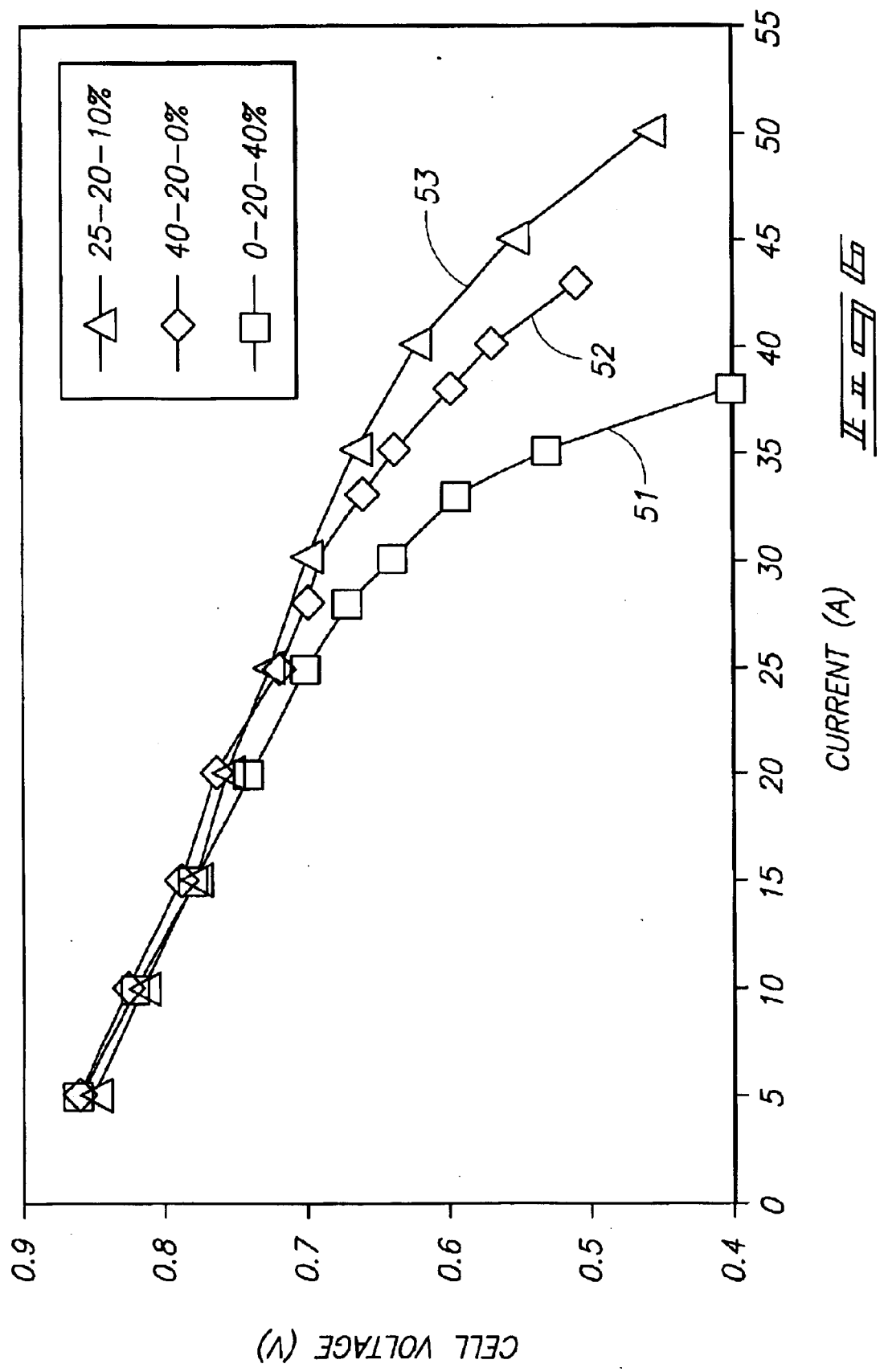
FIG. 6 is a graphic depiction of fuel cell voltage versus current for a fuel cell membrane electrode diffusion layer assembly as seen in FIGS. 1–4.

Referring now to FIG. 6 a second graph is provided and which further demonstrates other characteristics of the present invention. As seen in FIG. 6, line 51 depicts the performance of an ion exchange membrane fuel cell having a MEDLA 10 with a gas diffusion layer 22 and which has a plurality of zones 31, 32 and 33 respectively. The MEDLA 10 as depicted by line 51, has a first zone 31 which has substantially no PTFE content. The second zone 32 has a PTFE content of about 20%; and the third zone 33 has a PTFE content of about 40%. Referring now to line 52 in FIG. 6, the performance of an ion exchange membrane fuel cell is shown and wherein a MEDLA 10 incorporating the present invention includes a plurality of zones 30 having a variable hydrophobicity. As seen with respect to the line label 52, the first zone 31 has a PTFE content of about 40%; the second zone 32 has a PTFE content of about 20%; and the third zone has substantially no PTFE content. When compared with line 51 it is clear that line 52 depicts a fuel cell having substantially enhanced performance characteristics relative to current and voltage densities. Further, and referring to line 53, it will be seen that an ion exchange membrane fuel cell incorporating a MEDLA 10 having a plurality of zones 30 which includes a first zone 31 having a PTFE content of about 25%; a second zone 32 having a PTFE content of about 20%; and a third zone having a PTFE content of about 10% shows further enhanced performance characteristics relative to lines 51, and 52.

Figure 7:
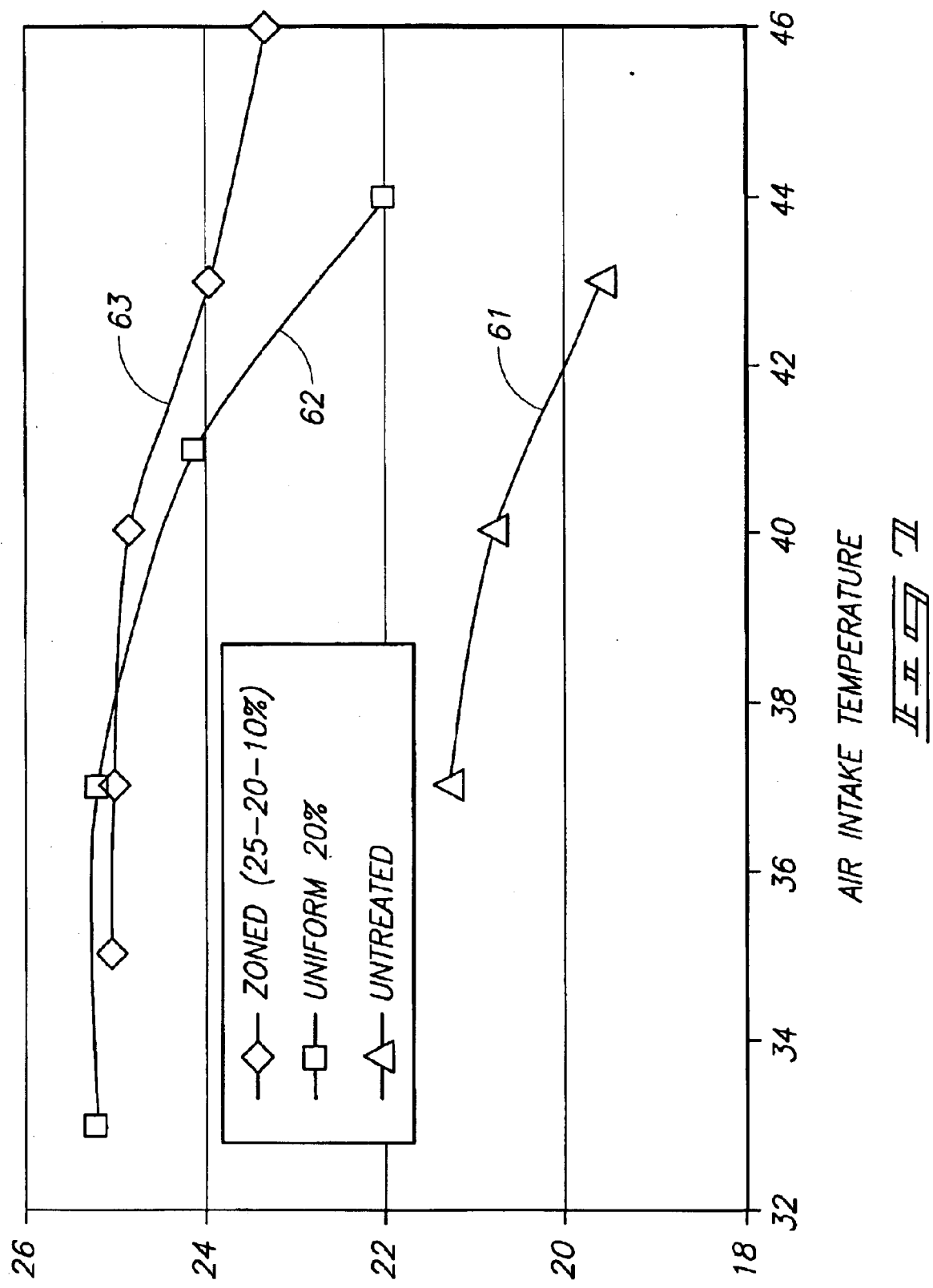
FIG. 7 is a graphic depiction of peak electrical power output at 0.6 volts versus air intake temperature in a fuel cell which employs a membrane electrode diffusion layer assembly as seen in FIGS. 1–4.

Referring now to FIG. 7 a graph is provided and which shows the peak power output, in Watts, for a fuel cell at an operating voltage of 0.6 volts, in Watts, versus an air intake temperature for the same ion exchange membrane fuel cell. In this regard, line 61 depicts the performance characteristics of an ion exchange membrane fuel cell which employs a membrane electrode diffusion layer assembly 10 which has a gas diffusion layer 22 which has not been treated in any fashion to enhance its hydrophobic nature. Line 62 as depicted in FIG. 7 shows an ion exchange membrane fuel cell having a MEDLA 10 which has a substantially uniform PTFE content of about 20%. A comparison of line 61 and 62 will show that the ion exchange membrane fuel cell employing a MEDLA 10 and having a substantially uniform hydrophobic nature provides enhanced performance characteristics for the ion exchange membrane fuel cell. Still further, and referring to line 63 in FIG. 7, the performance characteristics of an ion exchange membrane fuel cell is shown and which employs a MEDLA 10, which has a plurality of zones 30. In this regard the first zone 31 has a PTFE content of about 25%; the second zone 32 has a PTFE content of about 20%; and the third zone 33 has a PTFE content of about 10%. This clearly demonstrates that a MEDLA 10 having a gas diffusion layer 22 with a variable hydrophobicity provides enhanced performance characteristics for an ion exchange membrane fuel cell 11.

Comparing now FIG. 7 with FIG. 15, a further graph is provided and which shows the relationship of current in Amps as measured at 0.65 volts versus inlet air temperature for several ion exchange membrane fuel cells having membrane electrode diffusion layer assemblies 10 which have been treated to enhance their hydrophobic nature, and which further utilize a cathode heat sink as will be described in greater detail hereinafter. A comparison of FIGS. 7 an 15 will reveal that the hydrophobic treatment of the membrane electrode diffusion layer assemblies 10 in combination with the use a of cathode heat sink, as will be described below, significantly extends the ambient intake temperature range of a fuel cell so equipped by at least about 10° C. and sometimes more. A further discussion of FIG. 15 will be found in the paragraphs which follow.

Figure 8:
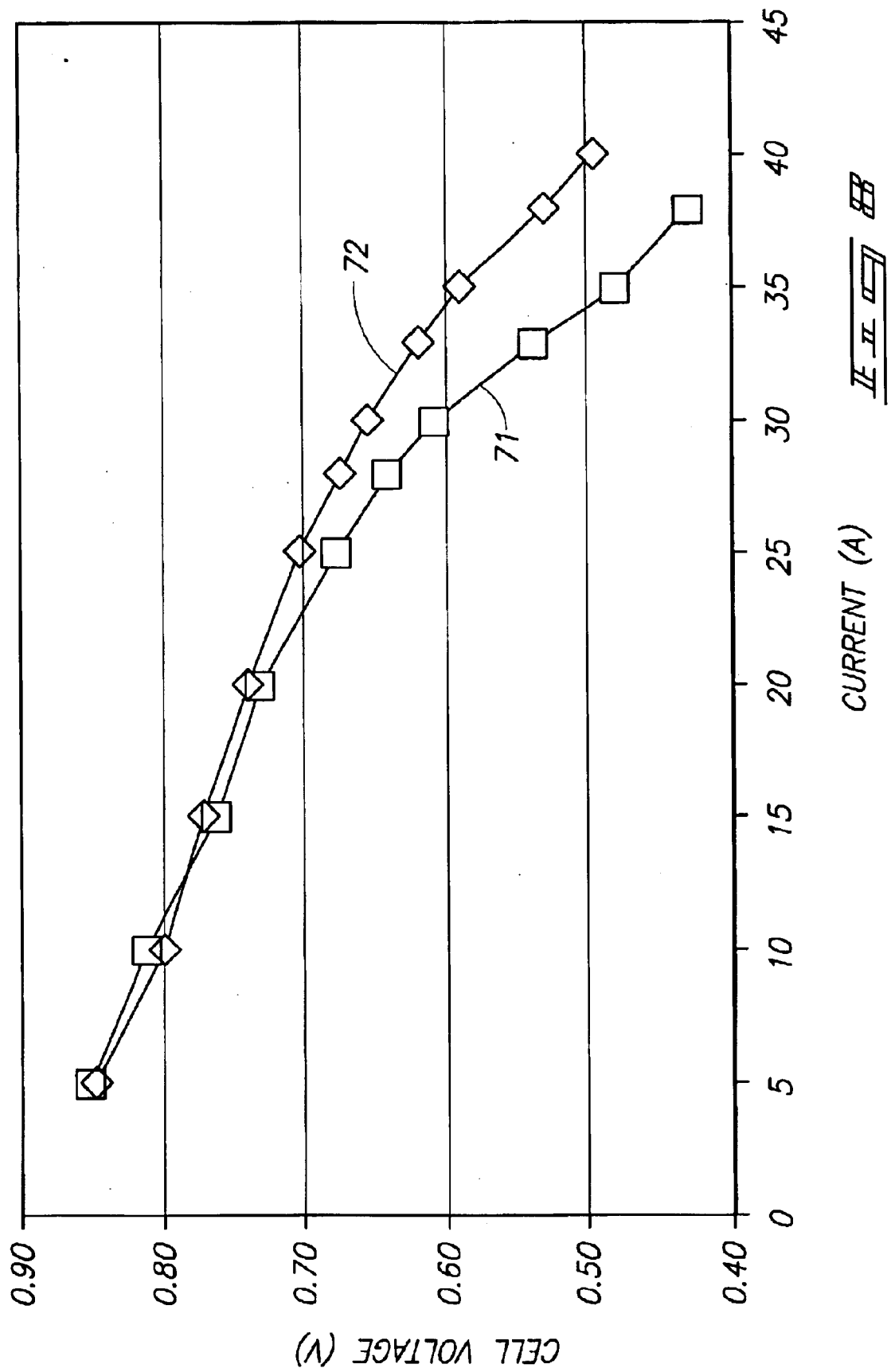
FIG. 8 is a graphic depiction of fuel cell voltage versus current in a fuel cell which employs a membrane electrode diffusion layer assembly as seen in FIGS. 1–4.

Referring now to FIG. 8, a graph is provided of a fuel cell voltage (in volts) versus current (in amps) as it relates to several ion exchange membrane fuel cells having different MEDLA 10 constructions. Line 71 depicts an ion exchange membrane fuel cell having a MEDLA 10 which includes a gas diffusion layer 22 and which is substantially untreated with respect to enhancing its hydrophobic nature. In contrast, line 72 depicts the performance characteristics of an ion exchange membrane fuel cell having a MEDLA 10 and which has a gas diffusion layer 22 located on the cathode side 13 of the ion exchange membrane 11, and which has a plurality of zones 30. In this regard, the cathode side 13 has a first zone 31 having a PTFE content of about 25%; a second zone 32 having a PTFE content of about 20%; and a third zone 33 having a PTFE content of about 15%. Still further, the anode side 12 is provided with a gas diffusion layer 22 which has a pair of zones 31 and 32 respectively. The first zone 31 on the anode side 12 has a PTFE content of about 5%; and the second zone 32 on the anode side is substantially untreated. As will be seen by comparing line 71 and 72, the fuel cell incorporating the MEDLA 10 having the construction as illustrated by line 72 has significantly enhanced performance characteristics relative to a fuel cell having a gas diffusion layer which is untreated.

Figure 9:
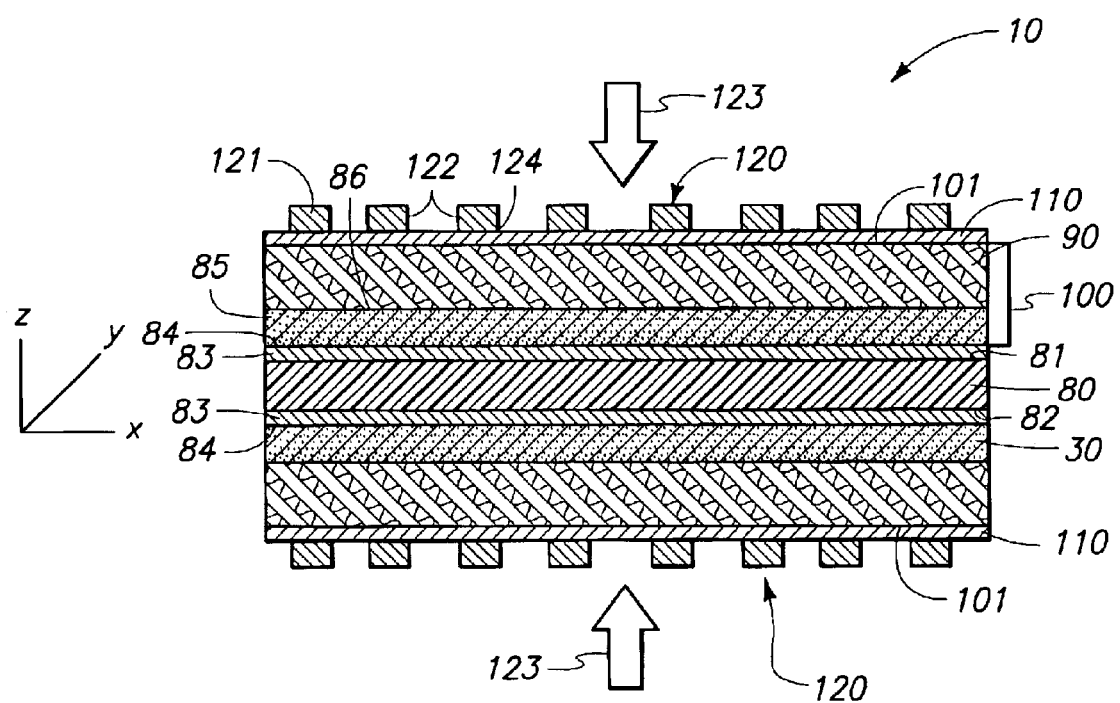
FIG. 9 is a fragmentary, transverse, vertical, sectional view of an ion exchange membrane fuel cell which utilizes some of the teachings of the present invention.

Referring now to FIG. 9, another alternative form of the membrane electrode diffusion layer assembly 10 is shown, and which is useful when incorporated into an ion exchange membrane fuel cell which will be discussed in greater detail hereinafter. As seen in this form of the invention, an ion exchange membrane 80 such as may be purchased under the trade name "Nafion" is provided. As earlier discussed this ion exchange membrane is a thin, flexible and sheet-like material which is made from a sulfonated fluoropolymer. This ion exchange membrane has opposite anode and cathode sides 81 and 82 respectively. As seen in FIG. 9, an electrode layer 83 is disposed in ion exchanging relation relative to the respective anode and cathode sides 81 and 82 respectively. The electrode layer 83 is of conventional design. This electrode layer facilitates the creation of ions which subsequently move across the ion exchange membrane 80. Each electrode layer 83 has an outwardly facing surface 84. A micro-diffusion layer, or first portion 85, having a given degree of porosity is juxtaposed relative to the outwardly facing surface 84 of the electrode layer 83. The micro-diffusion layer 85 comprises a carbon based slurry which may be modified, as earlier discussed, to provide different levels of porosity and hydrophobicity for the anode and cathode sides 81 and 82 respectively. This of course may be varied in X, Y and/or Z axes. Still further the porosity (permeability) and hydrophobicity of the micro-diffusion layer 85 may be manipulated, as discussed above, in various ways to achieve various desired performance characteristics such as providing effective hydration of the ion exchange membrane 80. Yet further while the micro-diffusion layer 85 is shown as a single layer, the micro-diffusion layer may further comprise individually discrete layers each having a different porosity (permeability) and hydrophobicity. Similarly, as was discussed earlier with respect to FIGS. 1–4, the hydrophobicity and porosity of each of these several layers may be varied substantially in a direction along the major surface 25. The micro-diffusion layer has an outwardly facing surface 86.

Referring still to FIG. 9, it will be seen that a macro-diffusion layer or second portion 90 is provided and which is juxtaposed relative to the outwardly facing surface 86 of the micro-diffusion layer 85. The macro-diffusion layer 90 comprises, in one form, a carbon fiber based sheet having a porosity (permeability), which is, as a general matter, greater than the porosity (permeability) of the micro-diffusion layer 85. This macro-diffusion layer may be commercially purchased under the trade name "Toray" from various commercial sources. The micro-diffusion layer 85 and the macro-diffusion layer 90, in combination, define a gas diffusion layer (GDL) which is generally indicated by the numeral 100. The gas diffusion layer 100 has an outwardly facing surface area 101 which has a surface texture or topology. It should be understood that the gas diffusion layer 100 while described herein as including both the macro-diffusion layer 90 and a micro-diffusion layer 85 may, in some forms of the invention, include only one of these two previously described diffusion layers. It being understood that FIG. 9 shows only one of several possible preferred forms of practicing the invention. The porosity (permeability) and hydrophobicity of the macro-diffusion layer 90 may be varied in assorted ways in the X, Y and Z axes. The gas diffusion layer 100 has an outwardly facing surface 101.

Referring still to FIG. 9 it will be seen that a porous metal coating 110 comprising one or more elements selected from the Periodic Table of Elements and which has an atomic number of 13 to 75 is positioned at least in partial covering relation relative to the outwardly facing surface area 101 of the gas diffusion layer 100. This metal coating forms a resulting metalized gas diffusion layer 100. The porous metal coating 110 may comprise an alloy; oxide; nitride; or carbide. In FIG. 9 the gas diffusion layer 100 and the porous metal coating 110 are disposed on both the anode and cathode sides 81 and 82. However, it will be appreciated that the gas diffusion layer 100, and the porous metal layer 110 may be disposed on only one of the anode or cathode sides 81 and 82 respectively. Yet further it is possible to fabricate a membrane electrode diffusion layer assembly 10 wherein the gas diffusion layer 100 is located on both the anode and cathode sides 81 and 82 respectively and the porous metal coating 110 is positioned on only one of the anode or cathode sides.

As discussed above, the gas diffusion layer 100 has an outwardly facing surface 101 having a surface texture or topology. Further, the porous metal coating 110 is applied in a fashion to the outwardly facing surface 101 such that it substantially conforms to the topology. In this regard the porous metal coating is applied in an amount of about 8 to about 150 milligrams of porous metal per square centimeter of the outwardly facing surface area 101. Moreover the porous metal coating 110 is applied in an amount and in a fashion which causes the resulting gas diffusion layer 100 to have an air impedance of about 15 to about 1,000 Gurley seconds. Gurley is defined in this application by the use of a Gurley Model 4118 (low pressure) set to low pressure with a 0.1 square inch orifice at a flow rate of about 100 cubic centimeters. As will be appreciated from studying FIG. 9, the porous metal coating 110 may be continuous as depicted in that view; or it may be discontinuous based upon other design concerns and the resulting desired fuel cell performance parameters being sought. For example, the varied application of the porous metal coating 110 in combination with varying the hydrophobicity of the various portions of the gas diffusion layer 100 has the effect of providing substantially optimal hydration for the underlying ion exchange membrane 80.

The porous metal coating 110, may include a substantially homogenous metal or the respective alloys oxides, nitrides and carbides of same. The metal coating 110 has a density of about 2.0 to about 19.0 grams per cubic centimeter. The porous metal coating may comprise nickel, iron, stainless steel, manganese, zinc, chromium, copper, zirconium, silver, titanium and tungsten and their alloys nitrides, oxides and carbides. For example, when the porous metal coating 110 is formed of nickel, this metal is deposited in an amount of about 28 to about 150 milligrams per square centimeter of surface area. On the other hand, when a porous metal coating of aluminum is employed it is deposited in an amount of about 8 to about 40 milligrams per square centimeter of surface area. As a general matter the porous metal coating 110 has an average thickness of about 25 to about 400 micrometers. The porous metal coating 110 is applied by conventional metal spraying techniques which are well known in the art, and further discussion of these techniques is neither warranted nor required in this application.

As will be understood from FIGS. 1–4 and FIG. 9, the porous metal coating 110 is borne by the outwardly facing surface 101 of the gas diffusion layer 22, 100 and is operable to vary both the hydrophobicity and/or porosity of the gas diffusion layer when the hydrophobicity is measured in a direction substantially along the major surface 25 as seen in FIGS. 1–4. As discussed above, the hydrophobicity and/or porosity of the gas diffusion layer 100 may be varied by the selective application or deposit of the metal coating 110 to provide favorable hydration conditions for the ion exchange membrane 80. Yet further, the deposit or application of the metal coating is varied to provide an enhanced current density for the ion exchange membrane 80, as will be discussed in greater detail below.

As noted above, porous metal coating 110 can be deposited in a manner which provides a continuously or selectively variable hydrophobicity and/or porosity for the gas diffusion layer 100. For example, the deposit of the porous metal coating 110 can be done in a manner to provide a plurality of discrete zones 30 which each have different, yet substantially constant hydrophobicity and/or porosity. Still further, in another alternative form of the invention, the porous metal coating 110 can be deposited in a manner to provide a plurality of discrete zones 30, and wherein at least one of the zones has a continuously variable or different hydrophobicity and/or porosity, and wherein the hydrophobicity and/or porosity of the respective zones are variable or have different relative values.

Referring still to FIG. 9 a fuel cell employing a MEDLA 10 will also include a current collector which is generally designated by the numeral 120, and which rests in ohmic electrical contact against the porous metal coating 110. The current collector 120 as seen in this view is of traditional design having a main body 121 which has open areas 122 formed therein, and which allows a source of fuel 14, such as hydrogen (on the anode side 12); and an oxidant supply 15, such as oxygen (on the cathode side 13); to reach the underlying porous metal coating 110, and associated gas diffusion layer 100. The current collector 120 is typically fabricated from a metal or metal alloy, and/or has a metal coating; cladding; or plating formed of nickel or similar metals. As noted above, the current collector transmits force or pressure 123 which is applied thereto and which maintains the current collector in ohmic electrical contact with the underlying porous metal coating 110. During subsequent fuel cell operation, contact resistance 124 is established between the main body 121 of the current collector 120, and the porous metal coating 110. In this regard with respect to the contact resistance, it has been discovered that the contact resistance, in the present arrangement, is substantially constant and independent of the force applied by way of the current collector 120. In this arrangement, therefore, as shown in FIG. 9, the contact resistance 124 remains substantially constant and independent of the force applied by way of the current collector 120, and the gas diffusion layer 100 has a variable hydrophobicity and/or porosity when measured in a direction which is substantially along the major surface 25. This particular arrangement, therefore, provides for substantially optimal hydration of the ion exchange membrane 80 while simultaneously providing an enhanced current density, and a force independent contact resistance.

Fuel cells are often modeled as a current source in series with a capacitance, and an accompanying electrical resistance. This electrical resistance is referred to as equivalent series resistance or ESR. The ESR of a typical fuel cell comprises, as a general matter, the electrical resistance of the membrane electrode diffusion layer assembly 10 plus the contact resistance 124 which is established between the membrane electrode diffusion layer assembly 10 and the adjacent current collector as shown at 120. In the present invention the ESR of the membrane electrode diffusion layer assembly 10 is substantially independent of the force or pressure applied to same. In relative comparison, the contact resistance 124 which exists between the MEDLA 10 and the adjacent current collector 120 in prior art assemblies, is typically a function of pressure or force which is applied by the current collector.

Referring now to FIG. 10, a graph is provided and which shows the relationship of the current produced; fuel cell ESR; and pressure for two different ion exchange membrane fuel cells, each having an approximately 16 square centimeter active, electrode surface area. Each fuel cell utilizes a prior art stainless steel current collector as that was described with respect to FIG. 9. In this graphic depiction, the earlier prior art relationships are clearly seen. In this regard the line label 130 shows the operational response of a prior art fuel cell which has a membrane electrode diffusion layer assembly 10 with no accompanying porous metal coating 110. As would be expected, as increasing pressure, expressed in terms of pounds per square inch, is applied to the current collector 120, the resulting electrical current output (as expressed in milliamps per square centimeter surface area of the active electrode surface area 83) is shown to rise proportionately. Conversely, and referring to the line labeled 131, for the same prior art ion exchange membrane fuel cell which does not have a porous metal layer or coating 110, it will be seen that the application of increasing pressure or force by way the current collector results in a decrease in the fuel cell ESR. Since the ESR of the membrane electrode diffusion layer assembly is a constant, and substantially independent of the force applied by the adjoining current collector 120, the change in the fuel cell ESR is due almost entirely to a change in the contact resistance. This ESR is expressed in milliohms per square centimeter of surface area. The relationship between current output and pressure applied is quite clear relative to using a prior art non-metalized gas diffusion layer, that is, the application of increasing amounts of pressure results, on the one hand, with decreasing contact resistance, and on the other hand, a corresponding increase in current output of the prior art fuel cell.

Referring still to FIG. 10, the performance of the present invention is graphically depicted with respect to the lines labeled 132 and 133 respectively for a second fuel cell which includes a metalized gas diffusion layer 100. As seen in FIG. 10 line 132 depicts a fuel cell with a prior art stainless steel current collector 120, as described more fully with respect to FIG. 9, and wherein the gas diffusion layer 100 of the membrane electrode diffusion layer assembly 10 has a porous metal coating 110 applied thereto. Line 132 illustrates that the current output (as expressed in milliamps per square centimeter of surface area) is substantially constant when exposed to increasing amounts of pressure as applied to, or by way of, the current collector 120. This is, of course, in stark contrast to line 130 which shows the relationship of pressure and current output in a fuel cell which does not have a metal coating 120 applied to the gas diffusion layer 100. Still further line 133 shows the same fuel cell having a porous metal layer or coating 110 applied to the gas diffusion layer 100, and wherein it will be seen that the fuel cell ESR (as expressed in milliohms per square centimeter of surface area) and thus contact resistance, remains substantially constant at pressures of less than about 300 pounds per square inch as applied by the current collector 120. Still further, line 132 and 133 demonstrate that a fuel cell incorporating the MEDLA 10 will operate at pressures which would render most prior art fuel cells nearly inoperable or commercially unattractive in view of the relatively low current outputs that it would provide.

The arrangement as seen in FIG. 9 provides a means by which a relatively inexpensive, and cost efficient fuel cell may be readily assembled while avoiding many of the shortcomings attendant with the prior art practices which include applying relatively sizeable amounts of force in order to provide effective electrical contact between the adjacent current collector 120, and the porous metal coating 110. In addition to the foregoing, one of the perceived shortcomings of the prior art fuel cell designs has been the propensity for such fuel cells to cause the ion exchange membrane to have various regions which have higher relative temperatures than adjacent regions. These higher temperatures have been caused, in part, due to non-uniform hydration of the ion exchange membrane. Further, this is often exacerbated by other design consideration which call for relatively high pressure to be applied in order to effect a lower contact resistance, and higher current outputs. In the present invention however, the gas diffusion layer 100 which is located adjacent to each electrode 83 has a variable hydrophobicity which provides an appropriate degree of hydration for the variable temperature regions that may be created on the ion exchange membrane 80, and which may be caused by the particular design of the fuel cell. The gas diffusion layer 100 which is located adjacent to each electrode 83 may have a plurality of zones 31–33 each having a variable hydrophobicity, and which provides an appropriate hydration for variable temperature regions which may occur on the anode side, cathode side or both sides thereof. Therefore one aspect of the present invention provides a method of optimizing the operation of a fuel cell which includes providing a fuel cell having an ion exchange membrane 80 with opposite anode and cathode sides 81 and 82, and a surface area; determining the surface area temperature of the ion exchange membrane during operation of the fuel cell to identify regions of the ion exchange membrane which have different temperatures and correspondingly different operational hydration requirements; providing a gas diffusion layer 100 made integral with the ion exchange membrane 80, and which has a variable hydrophobicity, and which provides for substantially optimal hydration of the regions of the ion exchange membrane which have a different surface temperature and operational hydration requirements; and regulating the operational temperature of the fuel cell. This temperature regulation is achieved by means of other features of the invention which will be discussed below.

Figure 11:
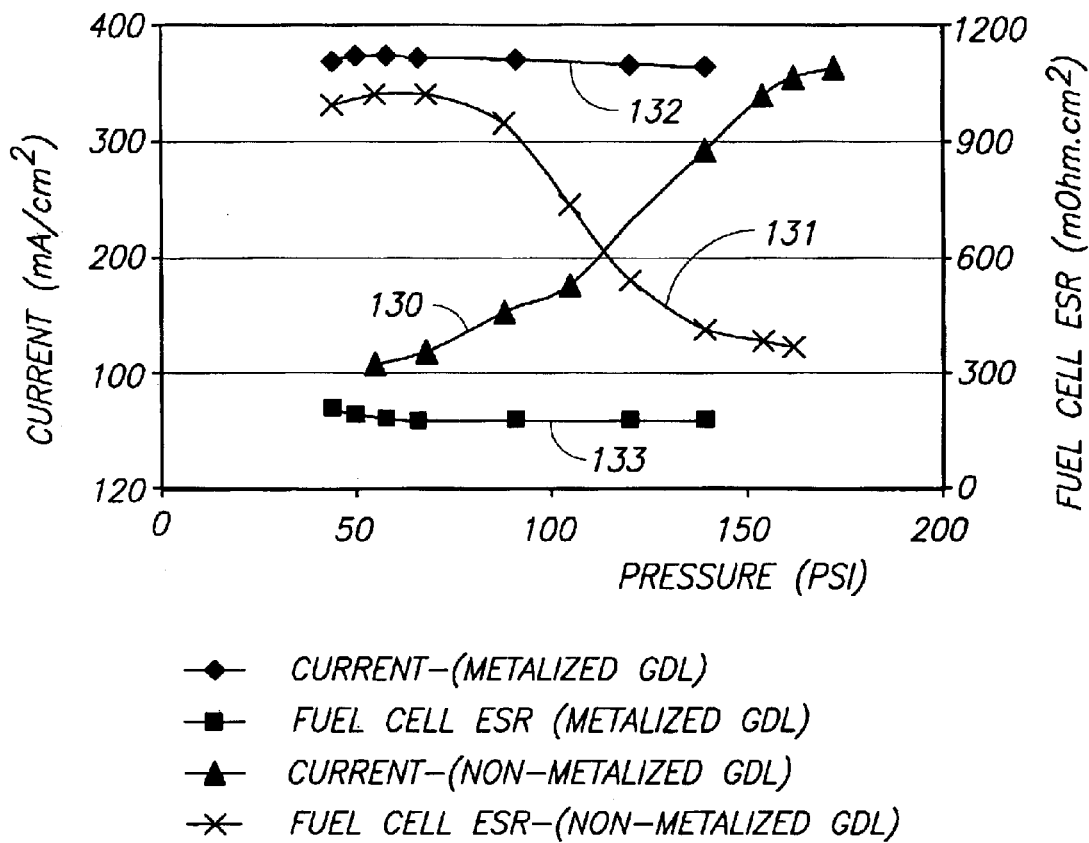
FIG. 11 is a fragmentary, transverse, vertical sectional view of an ion exchange fuel cell which utilizes some of the teachings of the present invention.
Figure 11:
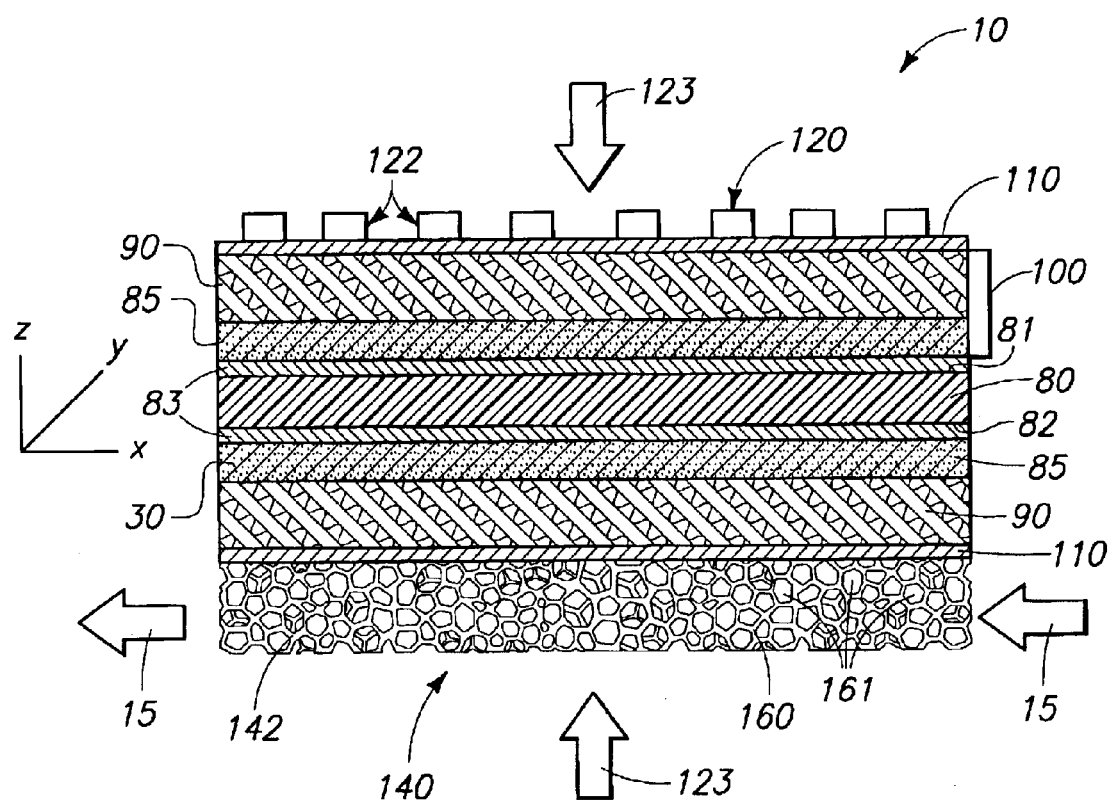

Referring now to FIG. 11, a fuel cell employing a MEDLA 10 as described more fully and specifically with respect to FIG. 9 is shown. Identical numbers from FIG. 9 describe like structures in FIG. 11. As seen in FIG. 11 a novel cathode heat sink is provided, and which is generally designated by the numeral 140. As should be understood, the cathode heat sink 140 is positioned in heat removing relation relative to the cathode side 82 of the ion exchange membrane 80. The cathode heat sink allows for the passage of the cathode air flow 15 therethrough such that oxygen (from ambient) may be delivered to the cathode side 82 of ion exchange membrane. In the arrangement as shown, the cathode heat sink facilitates the transmission of heat energy away from the ion exchange membrane 80, during fuel cell operation, at a rate which does not cause either excessive evaporation of water from the ion exchange membrane 80, or excessive retention of water by the same ion exchange membrane 80. As will be discussed below, and depending upon the arrangement of a fuel cell module which will incorporate the MEDLA 10, the cathode air flow 15 may remove a preponderance or less than a preponderance of the heat energy generated during fuel cell operation. As seen in FIG. 11, it should be understood that the cathode heat sink 140 is fabricated from an electrically conductive metal. The cathode heat sink may therefore simultaneously act as a cathode current collector. It is conceivable, in one form of the invention, that a current collector having a construction similar to that seen in FIG. 9, and designated by the numeral 120, could be placed into ohmic electrical contact with the cathode side 82 of the ion exchange membrane 80, and be located between the cathode side 82 of the ion exchange membrane 80, and the cathode heat sink 140. In this arrangement, the cathode heat sink would be electrically insulated from the cathode current collector (not shown) but would otherwise remain in heat removing relation relative thereto, and would still effectively function to remove heat energy from the ion exchange membrane 80. In yet a further alternative arrangement of the present invention, the position of the cathode current collector 120 and the cathode heat sink could be reversed. In this arrangement, the electrically conductive cathode heat sink 140 would lie in ohmic electrical contact with the cathode side 82; and the current collector (similar to that labeled 120) would rest in ohmic electrical contact thereagainst the cathode heat sink 140. In this alternative arrangement, the cathode heat sink 140 would not be electrically isolated from the current collector, but rather would be an electrical pathway to conduct electrical current away from the cathode side 82 and deliver it to the current collector lying thereagainst it.

Figure 12A:
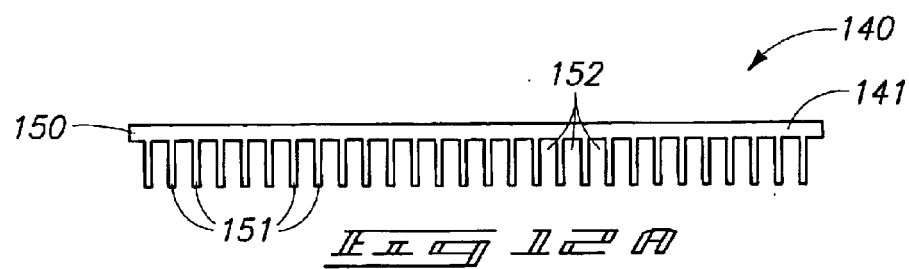
FIG. 12A is a somewhat enlarged, transverse, vertical sectional view of a first form of a cathode heat sink which may be utilized in the present invention.
Figure 12B:
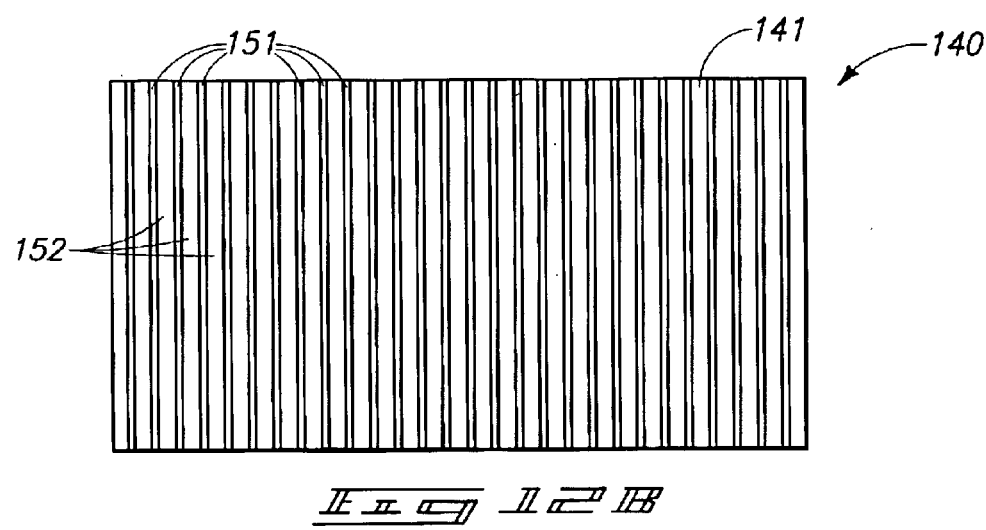
FIG. 12B is a somewhat enlarged, plan view of the first form of the cathode heat sink as seen in FIG. 12A.

The cathode heat sink 140 has first, second, and third forms which are generally indicated by the numerals 141, 142, and 143 respectively, and which are seen most clearly by reference to FIGS. 11, 12A, 12B, 13A, 13B, 14A, and 14B, respectively. Referring now to FIGS. 12A and B, it will be seen that the first form of the cathode heat sink 141 includes a main body 150 which has a plurality of vanes 151 which extend outwardly therefrom. In this arrangement, the vanes would rest thereagainst, or would otherwise be in contact with macrodiffusion layer 90 which is on the cathode side 82. The respective vanes define, therebetween, air channels, or passageways 152 which allow the cathode air stream 15 to pass therealong and deliver oxygen to the cathode side 82. The vanes, and corresponding channels are oriented in substantially the same direction and extend across the cathode heat sink. The vanes 151 are operable to thermally conduct away heat energy generated during fuel cell operation and radiate it in an effective fashion such that it may be removed by the cathode air flow 15.

Referring now to FIG. 11, 13A, and B the second form 142 of the cathode heat sink 140 is illustrated and which is fabricated from an air-permeable metal foam having an open-celled microstructure. The second form 142 has a main body 160, which defines a plurality of open cells or pores 161. The pores 161 are oriented in a fashion to facilitate the passage of the ambient, or cathode air stream 15 therethrough while simultaneously facilitating the removal of heat energy from the ion exchange membrane 80 and dissipating the heat energy to the cathode air flow 15. The cathode heat sink 142 is fabricated in whole, or in part, from a material which is selected from a group comprising aluminum; copper; a transition metal; or an alloy thereof. As illustrated, the plurality of pores have an average dimension of about 80 micrometers to about 8 millimeters; an average pore size of about 3 to about 300 pores per inch; and a porosity of about 50% to about 98.5%. Typically, the air-permeable metal foam forming second form 142 of the cathode heat sink 140 is fabricated from a metal or metal alloy which has a thermal conductivity of about 1.0 W/M-K to about 117 W/M-K at a temperature of 25 degrees C.; and an electrical resistivity of about 1.65 micro-ohms-centimeter to about 15 micro-ohms-centimeter at 25 degrees C. A suitable air-permeable metal foam can be commercially secured under the registered trademark Duocel from the company ERG. If the air-permeable metal foam current collector is fabricated from aluminum, for example, testing has revealed that the metal foam current collector has a resulting thermal conductivity of about 218 W/M-K.

Figure 14A:
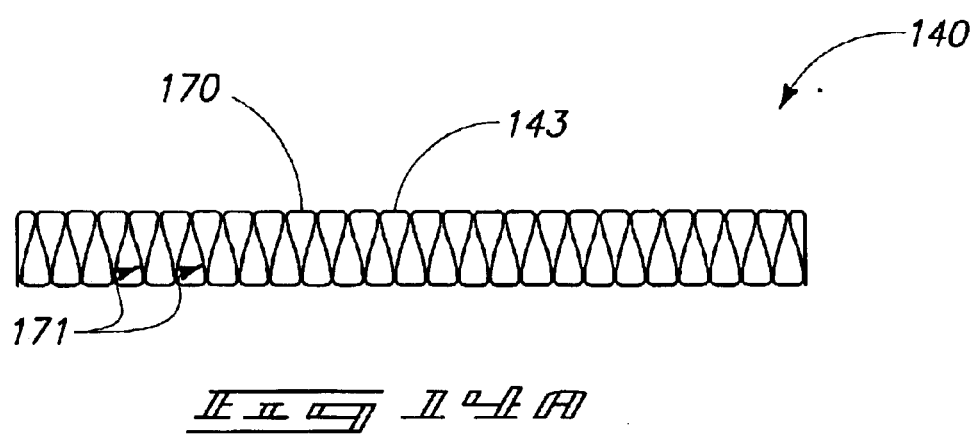
FIG. 14A is a somewhat enlarged, transverse, vertical sectional view of a third form of a cathode heat sink which may be utilized in the present invention.
Figure 14B:
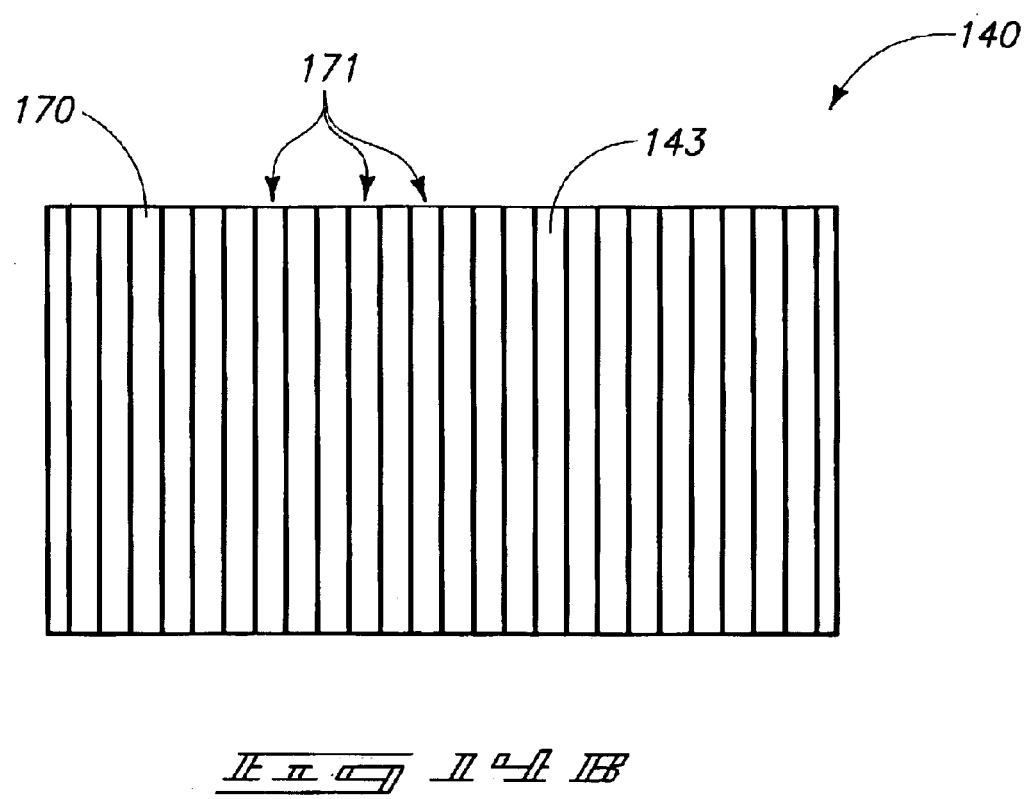
FIG. 14B is a somewhat enlarged, plan view of the third form of the cathode heat sink as seen in FIG. 14A.

Referring now to FIGS. 14A and B a third from 143 of the cathode heat sink 140 is provided and which is shown as a corrugated, pleated or accordion-shaped metal substrate. The third form 143 has, as noted, a corrugated main body 170 which defines a plurality of channels 171. The channels 171 permit the delivery of the cathode air flow 15 to the cathode side 82 of the ion exchange membrane 80. As should be understood from the foregoing discussion, the first and third forms 141 and 143 of the cathode heat sink 140 could be substituted for the second form 142 which is illustrated and shown in FIG. 11.

Figure 15:
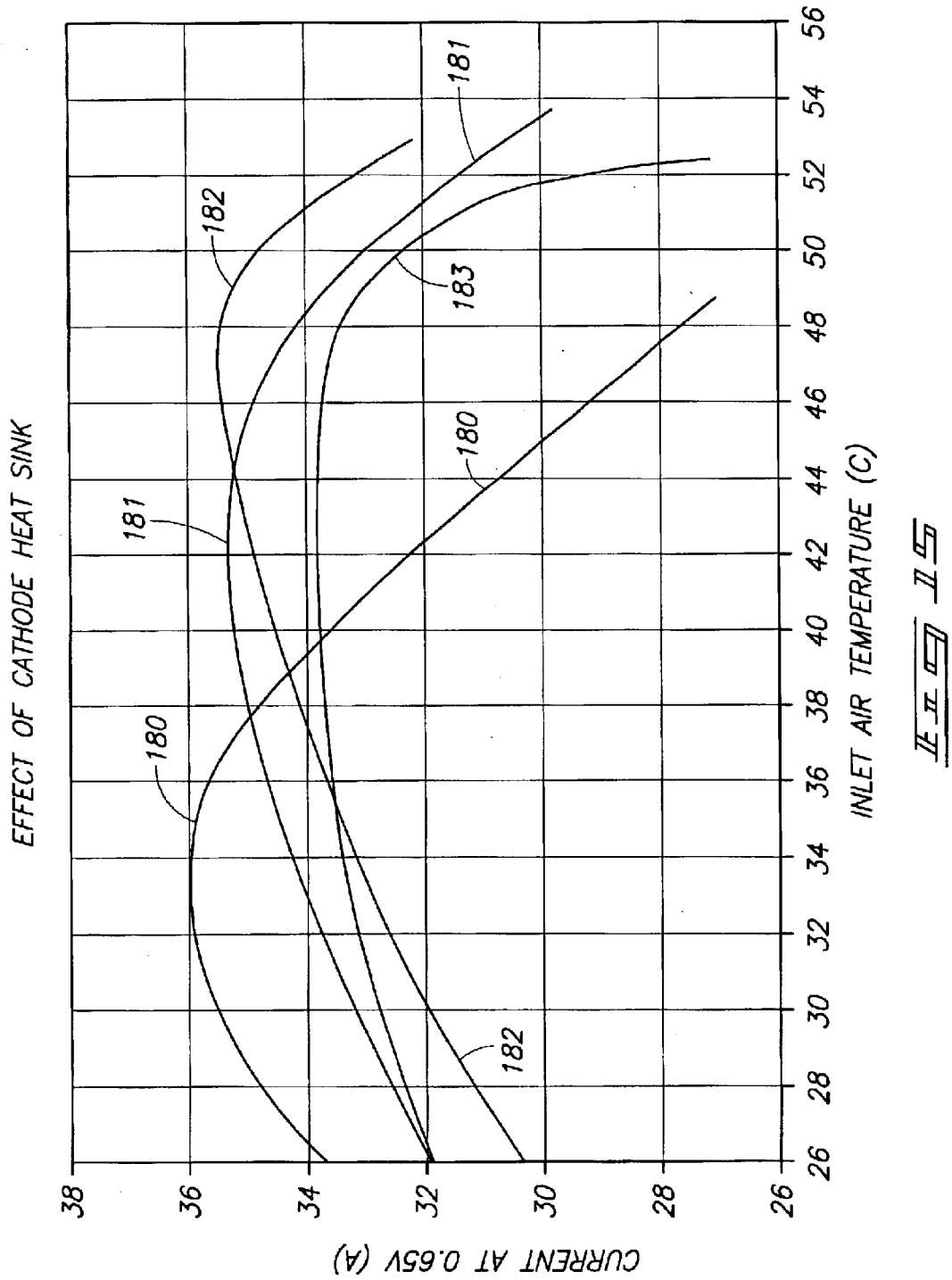
FIG. 15 is a graphic depiction which shows the effect of a cathode heat sink on the operation of an air cooled fuel cell module of the present invention with respect to the inlet air temperature and resulting electrical current output at 0.65 volts.

Referring now to FIG. 15, a graph is shown and which depicts the effect of the various cathode heat sinks 140 on the performance of a fuel cell incorporating a MEDLA 10 and which is illustrated in FIGS. 9 and 11, respectively. Line 180 depicts the performance of a MEDLA 10 in a fuel cell construction similar to that seen in FIG. 9, and wherein force 123 is applied to the prior art current collectors 120 by means of a plurality of plastic centipedes, or force application assemblies as more fully described in U.S. Pat. No. 6,030,718, the teachings of which are incorporated by reference herein. It will be seen by studying line 180 that the amount of electrical current generated by a MEDLA 10, of this previously described arrangement, will decrease precipitously as the cathode air 15 inlet temperature exceeds 36° C. This temperature effect is well understood by those skilled in the art. In this regard, it is known that increasing the temperature of the cathode air flow 15 allows for the increased evaporation of water from the ion exchange membrane 80. As this same water is removed more rapidly and in increasing amounts from the ion exchange membrane, current output decreases because of the corresponding lack of water which is necessary to facilitate the movement of ions across the ion exchange membrane 80.

Figure 13A:
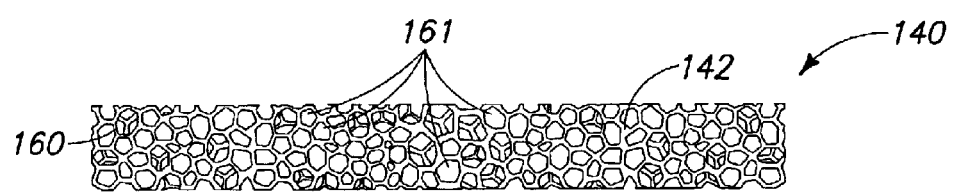
FIG. 13A is a somewhat enlarged, transverse, vertical sectional view of a second form of a cathode heat sink which may be utilized in the present invention.
Figure 13B:
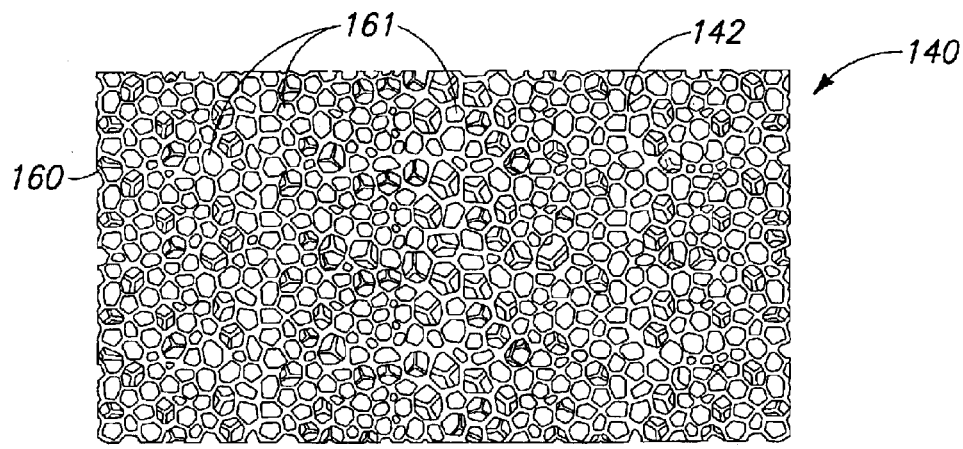
FIG. 13B is a somewhat enlarged, plan view of the second form of the cathode heat sink as seen in FIG. 13A.

Referring still to FIG. 14, line 181 depicts the effect of a cathode heat sink 142 as seen in FIG. 13A, and B on the performance of a MEDLA 10 as seen in the arrangement as depicted in FIG. 11. A comparison of the lines 180 and 181 will reveal that a fuel cell having a substantially equivalent MEDLA 10 in combination with a cathode heat sink 142 will be able to operate at significantly greater cathode air flow inlet temperatures than what was possible using the prior art practices as more clearly illustrated in U.S. Pat. No. 6,030,718. Referring still to FIG. 15, line 182 depicts the effect of the cathode heat sink 143 as seen in FIG. 14A, and B on the performance of a MEDLA 10 as seen in the physical arrangement which is depicted in FIG. 11. Again in relative comparison to the line labeled 180, which represents the prior art practice, a fuel cell so equipped can be operated at elevated cathode air temperatures thus increasing the usefulness of the fuel cell. Referring still to FIG. 15, line 183 depicts the effect of the cathode heat sink 141 as seen in FIGS. 12A and B on the performance of a MEDLA 10 as illustrated in FIG. 11. A comparison of line 183, and 180 (the prior art practice) demonstrates a similar enhanced operational capacity of the MEDLA 10 to operate at an elevated cathode air flow 15 inlet temperatures. As should be understood by a study of FIGS. 9–15, the present invention which includes the cathode heat sink 140 facilitates the appropriate hydration of the ion exchange membrane 80 by dissipating at least in part, the heat energy generated during operation of a fuel cell incorporating a MEDLA 10, while simultaneously permitting the ion exchange membrane 80 to retain sufficient hydration to allow the continuous production of current at acceptable current density levels notwithstanding elevated cathode air 15 temperatures which have heretofore have caused the ion exchange membrane to loose hydration, and thus produce less electrical current output.

Referring now to FIG. 16, a first form of an ion exchange fuel cell module which may incorporate the teachings of present invention 10 is generally indicated by the numeral 190. The fuel cell module, as illustrated, is discussed in significant detail in U.S. Pat. No. 6,030,718 the teachings of which are incorporated by reference herein. As a general matter, the fuel cell module 190, as shown, has a main body 191 which defines internal cavities (not shown) and which receive individual membrane electrode diffusion layer assemblies 10 as illustrated in FIGS. 1–4. In this arrangement, the anode surfaces 12 face inwardly toward these cavities defined by the main body 191, and the cathode sides 13 face outwardly so that they may be exposed to a stream of air which passes over the surface thereof. As should be understood from a study of the drawings, and the teachings of U.S. Pat. No. 6,030,718, multiple modules 190 are combined together into an ion exchange membrane fuel cell power system which is similar to that shown in FIG. 18. Still further, the multiple modules each enclose at least one ion exchange membrane. Still further the ion exchange membrane fuel cell power system is arranged such that at least one of the modules can be operationally disabled and removed from service, by hand, while the remaining modules continue to operate. Still further it should be understood that the fuel cell modules 190 produce heat energy during operation. Additionally, each module 190 has an airflow which regulates the operational temperature of each module by removing a preponderance of the heat energy therefrom. In this regard, the first form of the ion exchange membrane fuel cell module 190 has a fuel intake port 192 formed in the main body 191 and which supplies the fuel 14 to the anode sides 12 of the membrane electrode diffusion layer assemblies 10 which are enclosed therein. Still further the main body 191 defines a byproduct exhaust port 193 which removes waste water, unreacted fuel gas and any other resulting byproducts from the anode sides of the membrane electrode diffusion layer assemblies 10. Still further cathode covers 194 cooperate with the main body 191, and exert force on adjacent current collectors 196 which are placed into ohmic electrical contact relative to the individual membrane electrode diffusion layer assemblies 10. As earlier discussed, the current collectors may be what was earlier described in U.S. Pat. No. 6,030,718, or may be combined with a cathode heat sink 140 as described above. As seen in FIG. 16, the cathode covers 194 define cathode air passageways 195 which allow a stream of air to move therethrough and into contact with the cathode side 13 of the membrane electrode diffusion layer assemblies 10. In this arrangement a cathode airflow 197 is operable to remove a preponderance of the heat energy generated during ion exchange membrane fuel cell module operation. As seen in FIG. 16 current collectors 196 are provided and which are received internally of the main body 191. The current collectors each have an electrically conductive tab 197 which extends outwardly relative to the main body 191 and which may be selectively electrically coupled with an electrical bus (not shown) and which is made integral with an ion exchange membrane fuel cell power system.

Figure 17:
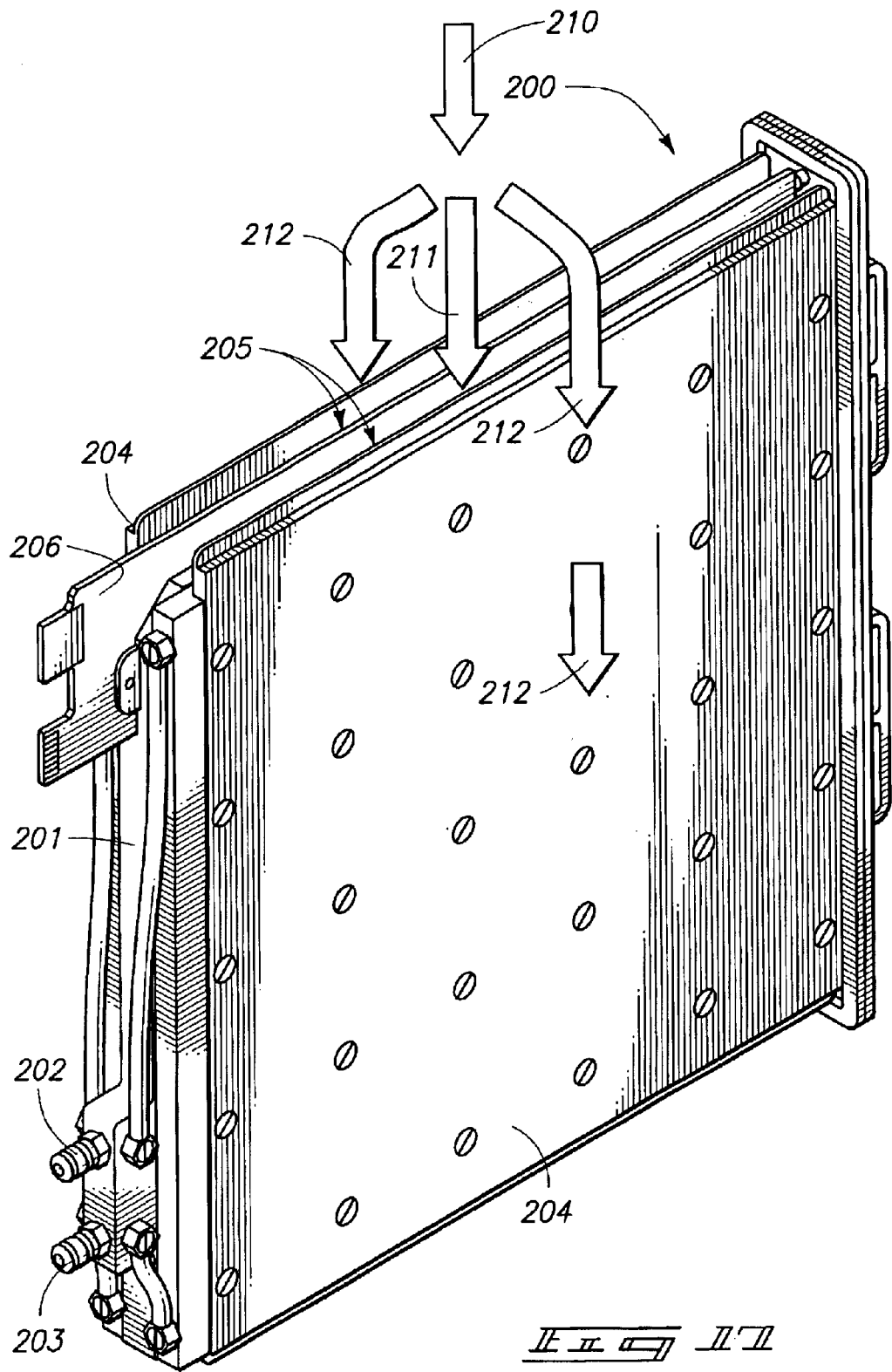
FIG. 17 is a perspective view of a second form of an ion exchange fuel cell module which employs the teachings of the present invention.

A second form of an ion exchange membrane fuel cell module which may incorporate the MEDLA 10, and the other teachings of the present invention is shown at numeral 200 in FIG. 17. This second form of the ion exchange membrane fuel cell module is discussed with greater specificity in U.S. Pat. No. 6,468,682 the teachings of which are incorporated by reference herein. As a general matter, however, the second form of the ion exchange membrane fuel cell module 200 has a main body 201 which includes a fuel inlet port 202 which delivers a fuel gas 14 to the anode side 12 of the MEDLAs 10 which are enclosed in the fuel cell module 200. Still further the main body 201 also includes a byproduct exhaust port 203 which removes any unreacted fuel gas 14, and any byproducts, such as water from the main body 201. As seen in FIG. 17, the second form of the ion exchange membrane fuel cell module 200 includes opposite anode heat sinks 204 which are disposed in heat removing relation relative to the anode side of the MEDLAs 10 which are incorporated therein. In the arrangement as shown in FIG. 17, at least two MEDLAs 10 are oriented in spaced relationship, one to the other. In this fuel cell module 200, the cathode sides 13 of the respective ion exchange membranes 11 are proximally related, and the anode sides 12 of the respective ion exchange membranes 11 are distally related. The cathode sides are oriented in spaced relation one to the other, and along a cathode air passageway which is generally indicated by the numeral 205. Located in electric current removing relation relative to each of the ion exchange membranes 11 is a current conductor assembly 206 which is operable to releasably electrically couple with an electrical bus (not shown) and which is made integral with an ion exchange membrane exchange fuel cell power system as will be discussed below. As seen in FIG. 17, the ion exchange membrane fuel cell module 200 is provided with a cathode airflow which is generally indicated by the numeral 210. The cathode air flow is bifurcated to provide a first air stream 211 which enters the fuel cell module 200 and passes along the cathode air passageway 205. Still further, a second air stream 212 provides airflow streams that move across the respective anode heat sinks 204. The second air stream 212 regulates in part, the operational temperature of the ion exchange membrane fuel cell module 200 by removing a preponderance of the heat energy generated by the ion exchange membrane fuel cell module therefrom. Also in the present arrangement, the first air stream 211 which passes through the cathode air passageway 205 removes less than a preponderance of the heat energy produced during operation of the ion exchange membrane fuel cell module 200. As should be appreciated, the cathode heat sink 140, earlier described, would be disposed along the cathode air passageway and would facilitate the dissipation of heat energy to the cathode air flow 210.

Figure 18:
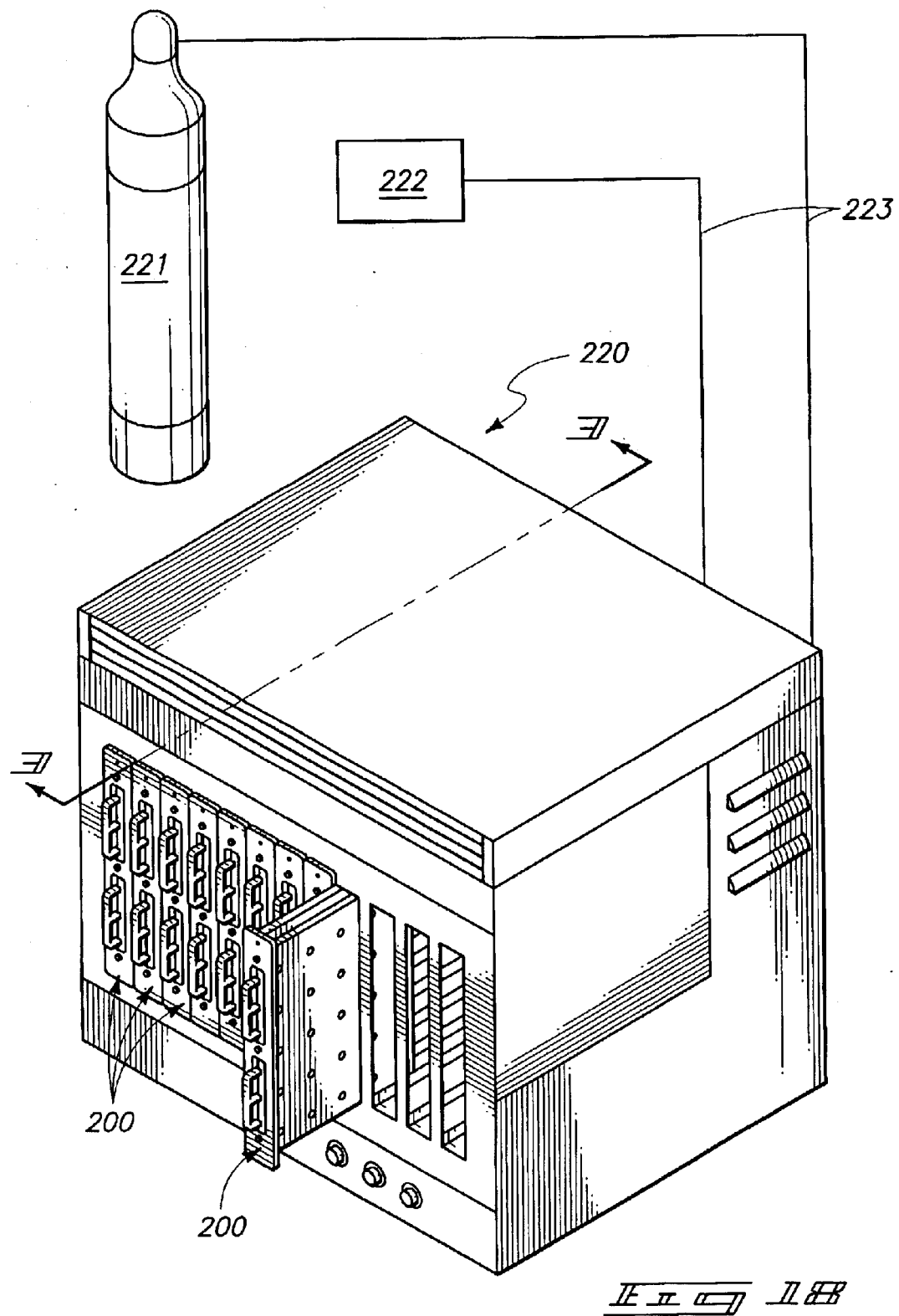
FIG. 18 is a perspective view of an ion exchange membrane fuel power system which may incorporate the teachings of the present invention.

Referring now to FIG. 18 an ion exchange membrane fuel cell power system is shown and which is generally designated by the numeral 220. As will be seen, multiple ion exchange membrane fuel cell modules 200 are provided. As was the case with the first form of the ion exchange membrane fuel cell module 190, at least one of the modules 200 can be operationally disabled and removed from service by hand, while the remaining modules 200 continue to operate. As seen, the fuel cell power system 220 is provided with a source of fuel which is generally indicated by the numeral 221. The source of fuel may include bottled hydrogen 221 or other similar fuel gases which may be supplied to the respective modules. Still further, a chemical reformer 222 may be provided and which may operate to take a source of a suitable hydrocarbon and react it in such a fashion so as to release a fuel gas, such as hydrogen, which may then be consumed during operation of the ion exchange membrane fuel cell modules 200. The source of fuel gas 221 and/or the chemical reform 222 is coupled to the fuel cell power system 220 by appropriate conduits 223.

OPERATION

The operation of the described embodiment of the present invention is believed to be readily apparent and is briefly summarized at this point.

The present invention is best understood by a study of FIGS. 1, 9, 11, and 12–14, respectively. As shown therein and in FIGS. 16 and 17 an air cooled fuel cell module 190 and 200 are shown and which includes an ion exchange membrane 11 having opposite anode and cathode sides 12 and 13, respectively. An electrode 20 is borne by each of the anode and cathode sides; and a cathode heat sink 140 is provided and which is positioned in heat removing relation relative to the cathode side of the ion exchange membrane. In the embodiment of the invention as described heretofore, the cathode heat sink 140 may simultaneously act as a current collector for the cathode side of the ion exchange membrane, or, in alternative forms of the invention, may work in combination with a prior art current collector 120 of conventional design. The cathode current collector 140 may assume various forms such as an air-permeable metal foam having an open celled microstructure as seen in FIG. 13A and B and which is generally designated by the numeral 142. Still further the cathode heat sink 140 may be fabricated from a metal substrate 141 as seen in FIGS. 12A and B and which defines a plurality of channels 152 which are oriented in substantially the same direction and which extend across the cathode heat sink 140. In yet a further form of the invention as seen in FIGS. 14A and B, the cathode heat sink 140, and which may further operate as a current collector, may also include a metal substrate 143 which has a corrugated configuration. As earlier discussed, during fuel cell module operation, water and heat energy are produced as by-products, and the cathode heat sink 140 facilitates the transmission of heat energy which is generated during fuel cell module operation away from the ion exchange membrane 11 at a rate which does not cause either excessive evaporation of water from the ion exchange membrane or excessive retention of water by the ion exchange membrane. Still further, in the arrangements as shown, the respective cathode heat sinks 140 simultaneously permit the supplying of a cathode air flow 15 in an amount, which, while supporting fuel cell module operation, does not simultaneously cause the evaporation of water from the ion exchange membrane in an amount which would substantially impede fuel cell module operation.

Therefore the present invention discloses a fuel cell module 190 or 200 which has an ion exchange membrane 11 having opposite anode and cathode sides 12 and 13; an electrode 20 borne on each of the anode and cathode sides, and wherein the fuel cell, during operation, generates heat energy and water as byproducts, and wherein the water produced as a byproduct operably hydrates, at least in part, the ion exchange membrane; an electrically conductive gas diffusion layer 22 is borne on one of the anode and/or cathode sides and which is disposed in at least partial covering relation relative to the electrode; a cathode air flow 15 having a flow rate, and which is supplied to the cathode side of the ion exchange membrane; and an air-permeable metal foam current collector 142 disposed in ohmic electrical contact with the cathode side of the ion exchange membrane, and which has a porosity and a thermal conductivity value, and wherein the porosity and thermal conductivity values of the air permeable metal foam current collector 142 are selected so as to permit the cathode air flow 15 which passes through the air-permeable metal foam to have a reduced flow rate while simultaneously providing an adequate amount of air to support fuel cell module operation, and while simultaneously facilitating the dissipation of at least a portion of the heat energy generated during fuel cell module operation, and wherein the cathode air flow rate further does not cause either, evaporation of excessive amounts of water from the ion exchange membrane, or retention of water by the ion exchange membrane in an excessive amount which would substantially impede fuel cell module operation.

Therefore it will be seen by reviewing the various graphs provided in the Figures that a fuel cell module 190 or 200 having a cathode heat sink 140 as described above along with other features of the invention, provides many advantages over the prior art devices and practices employed heretofore.

The present invention additionally effectively reduces contact resistance and resulting equivalent series resistance in a fuel cell and causes a resulting substantially constant current output. Still further, the present fuel cell has enhanced operational characteristics inasmuch as it can utilize a cathode air flow having elevated temperatures substantially above those which would have impeded prior art fuel cell operation. Moreover, the present invention provides for the efficient operational hydration of an ion exchange membrane incorporated in a fuel cell module of the construction described herein, thereby providing a fuel cell having increasingly robust performance characteristics which makes it desirable for various commercial applications.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An air cooled fuel cell module comprising:

an ion exchange membrane having opposite anode and cathode sides;

an electrode borne by each of the anode and cathode sides;

a current collector disposed in ohmic electrical contact with each of the anode and cathode sides, and wherein the cathode current collector is fabricated from an air-permeable metal foam having an open-celled microstructure, and which further acts as a heat sink to remove a portion of the heat energy generated by the fuel cell module during operation;

an anode heat sink which is fabricated from an air-permeable metal foam, and which is disposed in heat removing relation relative to the anode side of the ion exchange membrane; and an air flow supplied to the fuel cell module, and which includes a first component which passes, at least in part, through the air-permeable metal foam current collector disposed in ohmic electrical contact with the cathode side of the ion exchange membrane, and a second component which passes, at least in part, over the anode heat sink, and wherein the first and second components, in combination, dissipate a preponderance of the heat energy generated during operation of the fuel cell.

2. An ion exchange membrane fuel cell, comprising:

multiple modules each enclosing a membrane electrode diffusion assembly having an anode, and a cathode side, and wherein each module produces heat energy during operation; and an anode heat sink fabricated, at least in part, from an air-permeable metal foam, and which is positioned in heat removing relation relative to the anode side of the ion exchange membrane, and wherein each module has a bifurcated air flow which regulates the operational temperature of each module by removing the heat energy from the module, and wherein the bifurcated air flow passes, at least in part, over the anode heat sink.

* * * * *